United States Patent
Kao et al.

(10) Patent No.: US 9,832,598 B2
(45) Date of Patent: Nov. 28, 2017

(54) METHODS IN SHORT RANGE RADIO COMMUNICATION MASTER SUBSYSTEMS, MOBILE DEVICES, AND MULTI-MODE RADIO COMMUNICATION SYSTEMS

(71) Applicant: Intel IP Corporation, Santa Clara, CA (US)

(72) Inventors: Hsin-Yi Kao, Santa Clara, CA (US); Itzik Shahar, Kadima (IL); Brian Sublett, Menlo Park, CA (US); Hakan Magnus Eriksson, Hillsboro, OR (US); Ofer Hareuveni, Haifa (IL); Dongsheng Bi, Fremont, CA (US)

(73) Assignee: INTEL IP CORPORATION, Santa Clara, CA (US)

( * ) Notice: Subject to any disclaimer, the term of this patent is extended or adjusted under 35 U.S.C. 154(b) by 0 days.

(21) Appl. No.: 14/934,257

(22) Filed: Nov. 6, 2015

(65) Prior Publication Data
US 2017/0134882 A1 May 11, 2017

(51) Int. Cl.
| | |
|---|---|
| *H04B 7/00* | (2006.01) |
| *H04W 4/00* | (2009.01) |
| *H04W 72/04* | (2009.01) |
| *H04L 27/26* | (2006.01) |

(52) U.S. Cl.
CPC ......... *H04W 4/008* (2013.01); *H04L 27/2695* (2013.01); *H04W 72/0453* (2013.01)

(58) Field of Classification Search
CPC ..... H04W 16/14; H04W 24/00; H04W 48/16; H04W 72/02; H04W 72/085; H04W 16/02; H04W 16/12; H04W 28/26; H04W 36/06; H04L 27/0006; H04L 5/023

USPC ......................................... 455/41.2
See application file for complete search history.

(56) References Cited

U.S. PATENT DOCUMENTS

| | | | |
|---|---|---|---|
| 8,532,650 | B2 | 9/2013 | Goldsmith |
| 2004/0162106 | A1* | 8/2004 | Monroe ............... H04W 88/06 455/552.1 |
| 2007/0165754 | A1 | 7/2007 | Kiukkonen et al. |
| 2008/0013480 | A1* | 1/2008 | Kapoor .................... H04L 5/14 370/328 |

(Continued)

OTHER PUBLICATIONS

The Extended European Search Report based on Application No. 16197103.1(7 Pages) dated Mar. 20, 2017 (Reference Purpose Only).

*Primary Examiner* — Ajibola Akinyemi
(74) *Attorney, Agent, or Firm* — Viering, Jentschura & Partner mbB

(57) ABSTRACT

A mobile device may include a Short Range radio communication subsystem and a Cellular Wide Area radio communication subsystem. The Short Range radio communication master subsystem may include a processing circuit configured to identify a first plurality of channels, assign a blocking priority to one or more of the first plurality of channels, identify a second plurality of channels occupied by the Cellular Wide Area radio communication subsystem, and select a third plurality of channels from the first plurality of channels based on the blocking priority of the first plurality of channels and the frequency distance between each of the first plurality of channels and each of the second plurality of channels, and a radio transceiver configured to apply the third plurality of channels to transmit or receive data on a Short Range radio communication network.

24 Claims, 7 Drawing Sheets

(56) References Cited

U.S. PATENT DOCUMENTS

| | | | |
|---|---|---|---|
| 2012/0040715 A1* | 2/2012 | Fu | H04B 1/1027 455/553.1 |
| 2013/0065638 A1* | 3/2013 | Cai | H04W 72/02 455/553.1 |
| 2016/0073220 A1* | 3/2016 | Wang | H04W 4/008 455/41.2 |
| 2016/0080108 A1* | 3/2016 | Ben Ami | H04W 72/085 370/252 |
| 2016/0142177 A1* | 5/2016 | Chou | H04L 1/0005 370/329 |

* cited by examiner

FIG. 5

| Unblock UNUSED channels according to blocking priority | Within each blocking priority, unblock channel according to suborder |
|---|---|
| Priority #1 | Far end of occupied WiFi channels |
| Priority #2 | Far end of occupied WiFi channels |
| Priority #3 | Far end of occupied LTE channels |
| Priority #4 | Far end of LTE center frequency |
| Priority #5 | Best RSSI/PER (or arbitrary) | ns
METHODS IN SHORT RANGE RADIO COMMUNICATION MASTER SUBSYSTEMS, MOBILE DEVICES, AND MULTI-MODE RADIO COMMUNICATION SYSTEMS

TECHNICAL FIELD

Various embodiments relate generally to methods in Short Range radio communication master subsystems, mobile devices, and multi-mode radio communication systems.

BACKGROUND

Conventional Bluetooth systems may employ Adaptive Frequency Hopping (AFH) to improve transmission and reception performance. In an AFH scheme, a set of channels with strong channel quality may be selected from an overall pool of available Bluetooth channels. Bluetooth transmitter-receiver pairs may then rapidly switch carrier frequencies between the set of selected channels according to a predetermined channel hopping sequence. The set of selected channels may be dynamically adjusted based on channel quality, such as by adding new channels with high quality to the set of selected channels while removing channels with poor quality from the set of selected channels. Such may improve performance by employing strong channels for data transmission while avoiding weak channels.

The set of selected channels may be determined by a Bluetooth master device, which may indicate the set of selected channels to one or more Bluetooth slave devices. Bluetooth master devices may determine the set of selected channels based on a variety of different criteria that reflect channel quality, and may dynamically update the set of selected channels in response to fluctuating channel conditions.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 5 shows a Bluetooth channel unblocking hierarchy;

DESCRIPTION

Figure 1:
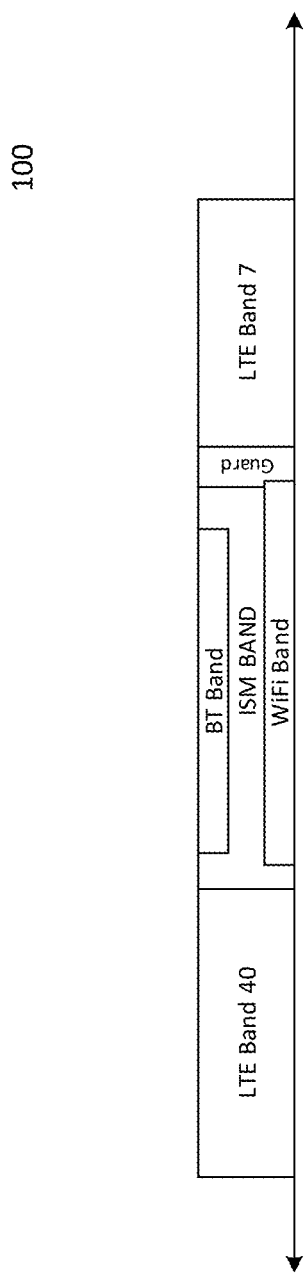
FIG. 1 shows a frequency chart illustrating a frequency spectrum licensing scheme.

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The words "plural" and "multiple" in the description and the claims, if any, are used to expressly refer to a quantity greater than one. Accordingly, any phrases explicitly invoking the aforementioned words (e.g. "a plurality of [objects]", "multiple [objects]") referring to a quantity of objects is intended to expressly refer more than one of the said objects. The terms "group", "set", "collection", "series", "sequence", "grouping", "selection", etc., and the like in the description and in the claims, if any, are used to refer to a quantity equal to or greater than one, i.e. one or more. Accordingly, the phrases "a group of [objects]", "a set of [objects]", "a collection of [objects]", "a series of [objects]", "a sequence of [objects]", "a grouping of [objects]", "a selection of [objects]", "[object] group", "[object] set", "[object] collection", "[object] series", "[object] sequence", "[object] grouping", "[object] selection", etc., used herein in relation to a quantity of objects is intended to refer to a quantity of one or more of said objects. It is appreciated that unless directly referred to with an explicitly stated plural quantity (e.g. "two [objects]" "three of the [objects]", "ten or more [objects]", "at least four [objects]", etc.) or express use of the words "plural", "multiple", or similar phrases, references to quantities of objects are intended to refer to one or more of said objects.

It is appreciated that any vector and/or matrix notation utilized herein is exemplary in nature and is employed solely for purposes of explanation. Accordingly, it is understood that the approaches detailed in this disclosure are not limited to being implemented solely using vectors and/or matrices, and that the associated processes and computations may be equivalently performed with respect to sets, sequences, groups, etc., of data, observations, information, signals, etc.

Furthermore, it is appreciated that references to a "vector" may refer to a vector of any size or orientation, e.g. including a 1×1 vector (e.g. a scalar), a 1×M vector (e.g. a row vector), and an M×1 vector (e.g. a column vector). Similarly, it is appreciated that references to a "matrix" may refer to matrix of any size or orientation, e.g. including a 1×1 matrix (e.g. a scalar), a 1×M matrix (e.g. a row vector), and an M×1 matrix (e.g. a column vector).

As used herein, a "circuit" may be understood as any kind of logic (analog or digital) implementing entity, which may be special purpose circuitry or a processor executing software stored in a memory, firmware, hardware, or any combination thereof. Furthermore, a "circuit" may be a hard-wired logic circuit or a programmable logic circuit such as a programmable processor, for example a microprocessor (for example a Complex Instruction Set Computer (CISC) processor or a Reduced Instruction Set Computer (RISC) processor). A "circuit" may also be a processor executing software, for example any kind of computer program, for example a computer program using a virtual machine code such as for example Java. Any other kind of implementation of the respective functions which will be described in more detail below may also be understood as a "circuit". It is understood that any two (or more) of the described circuits may be combined into a single circuit with substantially equivalent functionality, and conversely that any single described circuit may be distributed into two (or more) separate circuits with substantially equivalent functionality. In particular with respect to the use of "circuitry" in the claims included herein, the use of "circuit" may be understood as collectively referring to two or more circuits.

A "processing circuit" (or equivalently "processing circuitry") as used herein is understood as referring to any circuit that performs an operation(s) on signal(s), such as e.g. any circuit that performs processing on an electrical signal or an optical signal. A processing circuit may thus refer to any analog or digital circuitry that alters a characteristic or property of an electrical or optical signal, which may include analog and/or digital data. A processing circuit may thus refer to an analog circuit (explicitly referred to as "analog processing circuit(ry)"), digital circuit (explicitly referred to as "digital processing circuit(ry)"), logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Accordingly, a processing circuit may refer to a circuit that performs processing on an electrical or optical signal as hardware or as software, such as software executed on hardware (e.g. a processor or microprocessor). As utilized herein, "digital processing circuit(ry)" may refer to a circuit implemented using digital logic that performs processing on a signal, e.g. an electrical or optical signal, which may include logic circuit(s), processor(s), scalar processor(s), vector processor(s), microprocessor(s), controller(s), microcontroller(s), Central Processing Unit(s) (CPU), Graphics Processing Unit(s) (GPU), Digital Signal Processor(s) (DSP), Field Programmable Gate Array(s) (FPGA), integrated circuit(s), Application Specific Integrated Circuit(s) (ASIC), or any combination thereof. Furthermore, it is understood that a single a processing circuit may be equivalently split into two separate processing circuits, and conversely that two separate processing circuits may be combined into a single equivalent processing circuit.

As used herein, "memory" may be understood as an electrical component in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, etc., or any combination thereof. Furthermore, it is appreciated that registers, shift registers, processor registers, data buffers, etc., are also embraced herein by the "term" memory. It is appreciated that a single component referred to as "memory" or "a memory" may be composed of more than one different type of memory, and thus may refer to a collective component comprising one or more types of memory. It is readily understood that any single memory "component" may be distributed or/separated multiple substantially equivalent memory components, and vice versa. Furthermore, it is appreciated that while "memory" may be depicted, such as in the drawings, as separate from one or more other components, it is understood that memory may be integrated within another component, such as on a common integrated chip.

The term "base station" used in reference to an access point of a mobile communication network may be understood as a macro base station, micro base station, Node B, evolved NodeBs (eNB), Home eNodeB, Remote Radio Head (RRH), relay point, etc.

As used herein, a "cell" in the context of telecommunications may be understood as a sector served by a base station. Accordingly, a cell may be a set of geographically co-located antennas that correspond to a particular sectorization of a base station. A base station may thus serve one or more "cells" (or sectors), where each cell is characterized by a distinct communication channel. Furthermore, the term "cell" may be utilized to refer to any of a macrocell, microcell, femtocell, picocell, etc.

It is appreciated that the ensuing description may detail exemplary scenarios involving mobile device operating according to certain 3GPP (Third Generation Partnership Project) specifications, notably Long Term Evolution (LTE) and Long Term Evolution-Advanced (LTE-A). It is understood that such exemplary scenarios are demonstrative in nature, and accordingly may be similarly applied to other mobile communication technologies and standards, such as WLAN (wireless local area network), WiFi, UMTS (Universal Mobile Telecommunications System), GSM (Global System for Mobile Communications), Bluetooth, CDMA (Code Division Multiple Access), Wideband CDMA (W-CDMA), etc. The examples provided herein are thus understood as being applicable to various other mobile communication technologies, both existing and not yet formulated, particularly in cases where such mobile communication technologies share similar features as disclosed regarding the following examples.

The term "network" as utilized herein, e.g. in reference to a communication network such as a mobile communication network, is intended to encompass both an access component of a network (e.g. a radio access network (RAN) component) and a core component of a network (e.g. a core network component).

As utilized herein, the term "radio idle mode" or "radio idle state" used in reference to a mobile terminal refers to a radio control state in which the mobile terminal is not allocated at least one dedicated communication channel of a mobile communication network. The term "radio connected mode" or "radio connected state" used in reference to a mobile terminal refers to a radio control state in which the mobile terminal is allocated at least one dedicated uplink communication channel of a mobile communication network.

Unless explicitly specified, the terms "transmit" and "send" encompass both direct and indirect transmission/sending. Similarly, the term "receive" encompasses both direct and indirect reception unless explicitly specified. As utilized herein, the term "derived from" designates being obtained directly or indirectly from a specific source. Accordingly, data derived from a source includes data obtained directly from the source or indirectly from the source, i.e. through one or more secondary agents.

In a conventional Bluetooth system, a Bluetooth master (BT master) may determine a set of USED channels to use to communicate with one or more Bluetooth slaves (BT slaves). A BT master may select the set of USED channels from an available pool of Bluetooth channels, while the remaining channels that are not selected for the set of USED channels may accordingly be assigned to a set of UNUSED channels. Each channel in the available Bluetooth channel pool may correspond to a carrier frequency, which may each be carrier frequencies in an unlicensed frequency band such as the Industrial, Scientific, and Medical (ISM) band.

A BT master and one or more BT slaves may employ Adaptive Frequency Hopping (AFH) with the set of USED channels to wirelessly transmit and receive data, such as by repeatedly switching the active channel between different channels of the set of USED channels according to a predetermined channel hopping sequence. As the BT master assumes a controlling role in a Bluetooth system, the BT master may select the set of USED channels from the available Bluetooth channel pool. The BT master may select channels with high channel quality for the set of USED channels and may assign other channels with low channel quality to the set of UNUSED channels. The BT master may dynamically adjust the set of USED channels over time, such as by adding and/or removing channels from the set of USED channels based on fluctuating channel conditions. The set of USED channels employed for an AFH scheme may thus change over time. For example, a Bluetooth AFH scheme may utilize up to 79 1 MHz channels, where the operating channel switches pseudo-randomly during each time slot, e.g. 625 μs.

The BT master may select the set of USED channels based on a number of criteria that indicate channel quality, which may include channel estimations, channel classification reports, and channel maps. For example, the BT master may perform local channel estimation, such as by receiving wireless data on a given channel and analyzing the received data to determine channel quality. Specific measurements may include Received Signal Strength Indicator (RSSI) and Packet Error Rate (PER), which the BT master may measure by receiving wireless data and performing an evaluation on the data to determine a quantitative value. The BT master may determine which channels of the available Bluetooth channel pool to select for the set of USED channels based on the RSSI and PER metrics that are locally determined by the BT master. For example, the BT master may have an RSSI threshold and a PER threshold, and may assign channels to the set of USED channels if the channels produce an RSSI and/or PER measurement that is greater than the RSSI and/or PER thresholds, respectively. The BT master may assign channels to the set of UNUSED channels if the channels produce an RSSI and/or PER measurement that is less than the RSSI and/or PER thresholds, respectively. Such procedures to determine RSSI, PER, and other similar channel quality metrics will be appreciated by those of skill in the art.

BT slaves may additionally provide channel classification reports to a BT master that indicate the channel quality of the available Bluetooth channel pool. For example, BT slaves may analyze data received on a given channel to determine channel quality, such as by performing local RSSI and/or PER measurements on data received from a BT master device. The BT slave may then transmit a channel classification report to the BT master indicating the channel quality of the available Bluetooth channel pool. For example, the BT slave may transmit a channel classification report that designates one or more channels of the available Bluetooth channel pool as GOOD, BAD, or UNKNOWN. The BT slave may identify an RSSI and/or PER threshold to utilize in classifying channels as GOOD or BAD, such as by identifying channels with RSSI and/or PER measurements exceeding the respective RSSI and/or PER thresholds as GOOD and by identifying channels with RSSI and/or PER measurements less than the respective RSSI and/or PER thresholds as BAD. The BT slave may identify channels for which not enough channel quality information is available as UNKNOWN. The BT slave may then transmit a channel classification report to the BT master, which the BT master may utilize to determine the set of USED channels and set of UNUSED channels.

Additionally, the BT master may utilize channel maps to determine the set of USED channels and the set of UNUSED channels. For example, the BT master may obtain a host channel map, which may be provided by a higher-layer component than the BT master, e.g. within a host device. The host channel map may specify certain channels that the host device has identified as unsuitable for use. The host channel map may additionally specify certain channels that the host device has identified as suitable for use. The BT master may utilize such host channel maps to determine the set of USED channels and the set of UNUSED channels, such as by assigning channels identified as suitable by the host to the set of USED channels and by assigning channels identified as unsuitable by the host to the set of UNUSED channels.

Accordingly, the BT master may determine the set of USED channels and the set of UNUSED channels by analyzing local channel estimates, channel classification reports, and channel maps. The BT master may need to ensure that a minimum number of channels are included in the set of USED channels, e.g. to ensure that enough channels are in the set of USED channels to support an AFH scheme. For example, the set of USED channels applied in a Classic Bluetooth AFH scheme or Basic Rate/Enhanced Data Rate (BR/EDR) Bluetooth AFH scheme may need to contain at least e.g. 20 channels as a minimum number of channels (as opposed to a Low Energy (LE) Bluetooth scheme with a minimum number of USED channels of 2 channels). Accordingly, the BT master may not be able to assign all channels with poor channel quality (according to local channel estimates and/or channel classification reports) to the set of UNUSED channels, as such may result in a set of USED channels with an unacceptably low number of channels. The BT master may have a minimum number of USED channels, and may need to ensure that the set of USED channels includes at least the minimum number of USED channels.

Accordingly, the BT master may tentatively assign each channel to the set of USED channels or the set of UNUSED channels based on the local channel estimates, channel classification reports, and channel maps. Such may include assigning channels that do not satisfy a channel quality threshold to the set of UNUSED channels (based on local channel estimates), assigning channels indicated as BAD to the set of UNUSED channels (based on channel classification reports), assigning channels indicated as UNKNOWN to the set of UNUSED channels (based on channel classification reports), and/or assigning channels indicated as unsuitable by the host channel map to the set of UNUSED channels (based on host channel maps). The BT master may assign the remaining channels to the set of USED channels.

However, the tentative channel assignment may result in a relatively small number of channels in the set of USED channels, such as e.g. where the number of channels in the set of USED channels is less than the minimum number of USED channels. Accordingly, the BT master may need to "unblock" one or more channels from the set of UNUSED channels and re-assign these unblocked channels to the set of USED channels. The BT master may need to unblock a sufficient number of channels from the set of UNUSED channels until the set of USED channels contains the minimum number of USED channels.

Accordingly, the BT master may utilize local channel estimates to determine which of the set of UNUSED channels to unblock. For example, the BT master may perform local channel estimation on some or all of the available Bluetooth channel pool to obtain a channel quality metric for some or all of the available Bluetooth channels (e.g. RSSI metric, PER metric, etc.). The BT master may then compare the channel quality metrics of each channel of the set of UNUSED channels to identify one or more channels that have strong channel quality metrics, e.g. relatively high RSSI metrics and/or low PER metrics. The BT master may then unblock a number of UNUSED channels, i.e. by re-assigning the unblock channels to the set of USED channels, such as by unblocking a sufficient number of channels to increase the set of USED channels to at least the minimum number of USED channels. Accordingly, the BT master may select the UNUSED channels with the strongest channel quality metrics to unblock to obtain the set of USED channels. The BT master may then apply the set of USED channels during Bluetooth communications, such as by transmitting and/or receiving Bluetooth data with one or more BT slaves using the set of USED channels, e.g. according to an AFH scheme utilizing the set of USED channels.

It is appreciated that the aforementioned procedure at the BT master may be executed as a software and/or firmware module, which may be executed as program code (stored on a memory component) on a processing circuit such as a processor or controller. In an exemplary implementation, the channel unblocking scheme at the BT master may be executed as software on a Reduced Instruction Set Computing (RISC) processor, which may also include firmware executed on a RISC processor. A physical layer of the BT master may perform the local channel estimation measurements and provide any channel quality metrics to the software module. The physical layer may additionally receive and provide channel classification reports, such as from a BT slave, to the software module. The software module may also retrieve channel maps, such as host channel maps, which may be stored in a memory. The software module may then tentatively assign each of the available Bluetooth channels to the set of USED channels and the set of UNUSED channels based on the channel quality metrics (local channel estimates), BT slave channel classifications, and channel maps. The software module may then determine whether the set of USED channels contains the minimum number of USED channels, and, if not, the software module may compare the channel quality metrics from the local channel estimation to select one or more UNUSED channels to unblock and re-assign to the set of USED channels. Each of the individual operations involved therein, including classifying data (such as comparing data to a threshold to render a decision), assigning properties to data (such as assigning data to different groups), and comparing values of data (such as comparing one or more data values to identify maximum and/or minimum values), will be appreciated by those of skill in the art.

Such BT master and BT slaves may be incorporated into a variety of devices, including communication devices such as mobile phones, tablets, laptops, personal computers, etc. In many realizations, devices with Bluetooth-capability may also be configured to utilize other wireless communication technologies, including WiFi and a variety of cellular communication technologies including e.g. LTE, UMTS, GSM, W-CDMA, CDMA, etc. Accordingly, many BT slaves and particularly BT masters may be included in a host device capable of utilizing Bluetooth in addition to other wireless communication technologies.

The presence of such co-located wireless systems (i.e. other wireless communications systems common to the host device of the BT master) may lead to interference on the Bluetooth system, particularly including WiFi and cellular systems. FIG. 1 shows frequency chart 100 illustrating a possible allocation of radio frequencies around the ISM band. As shown in FIG. 1, LTE Band 40 (TDD, 2300-2400 MHz) may be located directly proximate to the ISM band (2400-2483.5 MHz) on the frequency axis, where the Bluetooth (2402-2480 MHz) and WiFi (2401-2495 MHz) operating bands may be contained within the ISM band. A guard band (2483.5-2500 MHz) may then separate the ISM band from LTE Band 7 (FDD UL, 2500-2570 MHz). Accordingly, both WiFi and LTE may fall substantially close to the Bluetooth operating band, where the WiFi operating band may significantly overlap with the Bluetooth operating band and LTE bands 7 and 40 may fall within 2 MHz and 20 MHz of the Bluetooth operating band on respective sides.

The significant overlap between Bluetooth and WiFi frequencies may lead to substantial interference to both communication systems, and may require resource-sharing procedures such as time-division frequency sharing in order to support coexistence of Bluetooth and WiFi. Similarly, LTE operation on bands 7 and 40 may additionally interfere with Bluetooth operation due to the insufficient isolation from LTE by many mobile devices. Accordingly, both WiFi and LTE may interfere with Bluetooth operation.

The level of interference by WiFi and/or LTE on Bluetooth operation at any point in time may depend on the current level of WiFi and/or LTE activity. For example, a Bluetooth system in a host device that is LTE-capable may not suffer from significant interference if the LTE subsystem is inactive or is currently only receiving (i.e. not transmitting). Similarly, a Bluetooth system in a host device that is WiFi-capable may not suffer from significant interference if the WiFi subsystem is inactive or is currently only receiving. It is appreciated that numerous other wireless communication technologies may interfere with Bluetooth operation depending on the particular frequency allocation.

As previously indicated, a BT master may perform local channel estimation in order to obtain channel quality metrics for available Bluetooth channels in the available Bluetooth channel pool. While the local channel estimation may reflect significant interference by LTE and/or WiFi, the interference may result in many channels being tentatively blocked (initially assigned to the set of UNUSED channels) due to poor channel quality metrics for many of the available Bluetooth channels obtained during local channel estimation. The potential thus exists that one or more channels that are significantly interfered by LTE and/or WiFi may be inadvertently unblocked (re-assigned to the set of USED channels in order to realize the minimum number of USED channels) by the BT master as the RSSI and/or PER measurements for many channels are substantially contaminated. Accordingly, overreliance on only local channel estimation to perform channel unblocking may be flawed as certain channels that are actively being used or interfered with by WiFi and/or LTE may be unblocked. Use of such channels for AFH may degrade performance.

Figure 2:
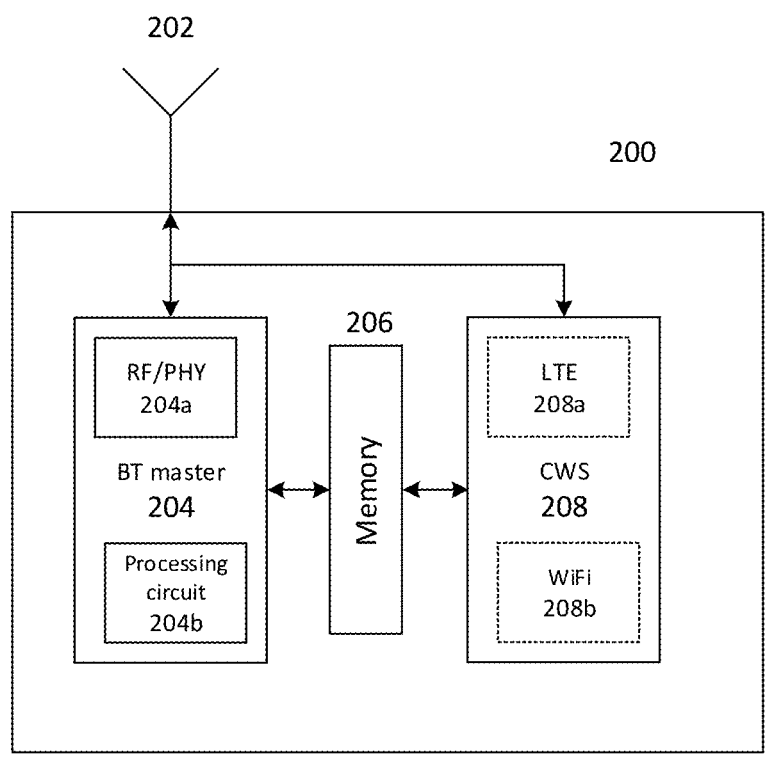
FIG. 2 shows an internal configuration of a mobile device.

FIG. 2 shows mobile device 200. As shown in FIG. 2, mobile device 200 may include antenna system 202, BT master subsystem 204, shared memory 206, and co-located wireless system(s) (CWS) 208. As shown in FIG. 1, BT master subsystem 204 may include radio frequency and physical layer (RF/PHY) circuit 204a and processing circuit 204b. It is appreciated that RF/PHY circuit 204a is denoted as a single component in FIG. 2 for simplicity, and that RF/PHY circuit 204a may be realized as separate RF and PHY circuits. It is appreciated that CWS 208 may be e.g. an LTE wireless system, a WiFi wireless system, a UMTS wireless system, a GSM wireless system, etc. Alternatively CWS 208 may be composed of two or more wireless systems, such as an LTE wireless system and a WiFi wireless system. CWS 208 may additionally include one or more RF transceivers and wireless communication modems, and accordingly may be configured to support wireless communications according to one or more given Radio Access Technologies (RATs).

The communication technology/technologies supported by BT master subsystem 204 and CWS 208 may be classified as either Short Range radio communication technologies, a Metropolitan Area System radio communication technologies, or Cellular Wide Area radio communication technologies. Short Range radio communication technologies include e.g. a Bluetooth radio communication technology, an Ultra Wide Band (UWB) radio communication technology, and/or a Wireless Local Area Network radio communication technology (e.g. according to an IEEE 802.11 (e.g. IEEE 802.11n) radio communication standard)), IrDA (Infrared Data Association), Z-Wave and ZigBee, HiperLAN/2 ((HIgh PErformance Radio LAN; an alternative ATM-like 5 GHz standardized technology), IEEE 802.11a (5 GHz), IEEE 802.11g (2.4 GHz), IEEE 802.11n, IEEE 802.11VHT (VHT=Very High Throughput). Cellular Wide Area radio communication technologies include e.g. a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology (e.g. UMTS (Universal Mobile Telecommunications System), FOMA (Freedom of Multimedia Access), 3GPP LTE (Long Term Evolution), 3GPP LTE Advanced (Long Term Evolution Advanced)), CDMA2000 (Code division multiple access 2000), CDPD (Cellular Digital Packet Data), Mobitex, 3G (Third Generation), CSD (Circuit Switched Data), HSCSD (High-Speed Circuit-Switched Data), UMTS (3G) (Universal Mobile Telecommunications System (Third Generation)), W-CDMA (UMTS) (Wideband Code Division Multiple Access (Universal Mobile Telecommunications System)), HSPA (High Speed Packet Access), HSDPA (High-Speed Downlink Packet Access), HSUPA (High-Speed Uplink Packet Access), HSPA+(High Speed Packet Access Plus), UMTS-TDD (Universal Mobile Telecommunications System-Time-Division Duplex), TD-CDMA (Time Division-Code Division Multiple Access), TD-CDMA (Time Division-Synchronous Code Division Multiple Access), 3GPP Rel. 8 (Pre-4G) (3rd Generation Partnership Project Release 8 (Pre-4th Generation)), UTRA (UMTS Terrestrial Radio Access), E-UTRA (Evolved UMTS Terrestrial Radio Access), LTE Advanced (4G) (Long Term Evolution Advanced (4th Generation)), cdmaOne (2G), CDMA2000 (3G) (Code division multiple access 2000 (Third generation)), EV-DO (Evolution-Data Optimized or Evolution-Data Only), AMPS (1G) (Advanced Mobile Phone System (1st Generation)), TACS/ETACS (Total Access Communication System/Extended Total Access Communication System), D-AMPS (2G) (Digital AMPS (2nd Generation)), PTT (Push-to-talk), MTS (Mobile Telephone System), IMTS (Improved Mobile Telephone System), AMTS (Advanced Mobile Telephone System), OLT (Norwegian for Offentlig Landmobil Telefoni, Public Land Mobile Telephony), MTD (Swedish abbreviation for Mobiltelefonisystem D, or Mobile telephony system D), Autotel/PALM (Public Automated Land Mobile), ARP (Finnish for Autoradiopuhelin, "car radio phone"), NMT (Nordic Mobile Telephony), Hicap (High capacity version of NTT (Nippon Telegraph and Telephone)), CDPD (Cellular Digital Packet Data), Mobitex, DataTAC, iDEN (Integrated Digital Enhanced Network), PDC (Personal Digital Cellular), CSD (Circuit Switched Data), PHS (Personal Handyphone System), WiDEN (Wideband Integrated Digital Enhanced Network), iBurst, Unlicensed Mobile Access (UMA, also referred to as also referred to as 3GPP Generic Access Network, or GAN standard)). Metropolitan Area System radio communication technologies may include e.g. a Worldwide Interoperability for Microwave Access (WiMax) (e.g. according to an IEEE 802.16 radio communication standard, e.g. WiMax fixed or WiMax mobile), WiPro, HiperMAN (High Performance Radio Metropolitan Area Network) and/or IEEE 802.16m Advanced Air Interface.

Accordingly, BT master 204 may support a Short Range radio communication technology (Bluetooth), while CWS 208 may support one or more Short Range (e.g. WiFi in the case of WiFi subsystem 208b) or Cellular Wide Area radio communication technologies (e.g. LTE in the case of LTE subsystem 208a).

As will be detailed, mobile device 200 may be a mobile device comprising a Short Range radio communication subsystem (BT master subsystem 204) and a Cellular Wide Area radio communication subsystem (LTE subsystem 208a), wherein the Short Range radio communication master subsystem includes a processing circuit (processing circuit 204b) configured to identify a first plurality of channels, assign a blocking priority to one or more of the first plurality of channels, identify a second plurality of channels occupied by the Cellular Wide Area radio communication subsystem, and select a third plurality of channels from the first plurality of channels based on the blocking priority of the first plurality of channels and the frequency distance between each of the first plurality of channels and each of the second plurality of channels, and a radio transceiver (RF portion of RF/PHY 204a) configured to apply the third plurality of channels to transmit or receive data on a Short Range radio communication network.

Although depicted as a single antenna in FIG. 1, antenna system 202 may be composed of one or more dedicated or shared antennas, e.g. may be an antenna array. For example, antenna system 202 may be an antenna array with two dedicated antennas (or two sets of dedicated antennas) each assigned to BT master subsystem 204 and CWS 208, respectively. Antenna system 202 may therefore receive wireless radio frequency signals, transduce the wireless radio frequency signals to generate electrical radio frequency signals, and provide the electrical radio frequency signals to BT master subsystem 204 and CWS 208. BT master subsystem 204 and CWS 208 may also provide electrical radio frequency signals to antenna system 202 (such as RF/PHY 204a and an RF transceiver component of CWS 208), which antenna system 202 may transduce and transmit as wireless radio frequency signals. Such antenna reception/transmission and RF reception/transmission/modulation/demodulation operations will be appreciated by those of skill in the art.

As will be detailed, processing circuit 204b may act as a control circuit of BT master subsystem 204, such as by controlling RF/PHY 204a to transmit and receive Bluetooth signals in accordance with a Bluetooth communication scheme. Processing circuit 204b may be implemented as a processor, such as a Reduced Instruction Set Computing (RISC) processor configured to execute program code. Processing circuit 204b may thus be a RISC Central Processing Unit (CPU) executing program code. The program code may correspond to one or more software and/or firmware control modules, which when executed by processing circuit 204b may dictate control over BT master subsystem 204, e.g. in accordance with a Bluetooth protocol stack. Accordingly, such software and/or firmware control modules may provide control logic to provide control to dictate the operation of BT master subsystem 204 in accordance with a Bluetooth communication scheme. It is understood that future references to the operation of BT master subsystem 204 refer to actions by processing circuit 204b in response to execution of software and/or firmware control modules.

BT master subsystem 204 may be configured to perform local channel estimation to obtain channel quality metrics including RSSI, PER, etc. BT master subsystem 204 may perform such local channel estimation by receiving radio frequencies from antenna system 202 and performing radio and baseband processing at RF/PHY 204a, such as by performing carrier frequency and baseband demodulation to obtain digital baseband signals from analog radio signals provided by antenna system 202. RF/PHY 204a may additionally be configured to perform radio measurements on received signals, such as by processing the received signals to obtain quantitative radio measurement metrics, such as RSSI, PER, etc. RF/PHY 204a may thus be configured to obtain the channel quality metrics utilized as part of local channel estimation at BT master subsystem 204.

RF/PHY 204a may be configured to interact with processing circuit 204b. As will be further detailed, processing circuit 204b may control RF/PHY 204a to receive and transmit Bluetooth signals and perform radio measurements according to software and/or firmware control modules executed by processing circuit 204b. Processing circuit 204b may be configured to determine the set of USED channels and the set of UNUSED channels and provide at least the set of USED channels to RF/PHY 204a. RF/PHY 204a may then be configured to transmit and receive Bluetooth signals in accordance with an AFH scheme using the set of USED channels.

As previously detailed, BT master subsystem 204 may have an available Bluetooth channel pool composed of every channel available for use in a Bluetooth communication scheme. BT master subsystem 204 may determine a set of USED channels and a set of UNUSED channels from the available Bluetooth channel pool, such as based on local channel estimations, channel classification reports, and channel maps (as will be detailed). BT master subsystem 204 may tentatively assign channels of the available Bluetooth channel pool to either the set of USED channels or the set of UNUSED channels. BT master subsystem 204 may then determine whether the set of USED channels contains at least the minimum number of USED channels, which may be a predefined threshold. If the set of USED channels contains at least the minimum number of USED channels, BT master subsystem 204 may proceed to transmit and/or receive wireless data in accordance with a Bluetooth communication scheme, such as by applying the set of USED channels to transmit and/or receive data with one or more BT slaves with an AFH scheme. Alternatively, if the set of USED channels does not contain at least the minimum number of USED channels, BT master subsystem 204 may unblock one or more of the UNUSED channels to obtain a set of USED channels containing at least the minimum number of USED channels.

As opposed to sole reliance on local channel estimations to unblock UNUSED channels (as previously detailed above), BT master subsystem 204 may alternatively (or additionally) utilize co-located wireless system channel maps (e.g. from CWS 208) to select UNUSED channels to unblock, thus re-assigning the UNUSED channels to the set of USED channels. BT master 204 may additionally assign the UNUSED channels a blocking priority, where UNUSED channels with higher blocking priorities are less likely to be unblocked than UNUSED channels with lower blocking priorities, and may apply the blocking priorities to unblock UNUSED channels.

Figure 3:
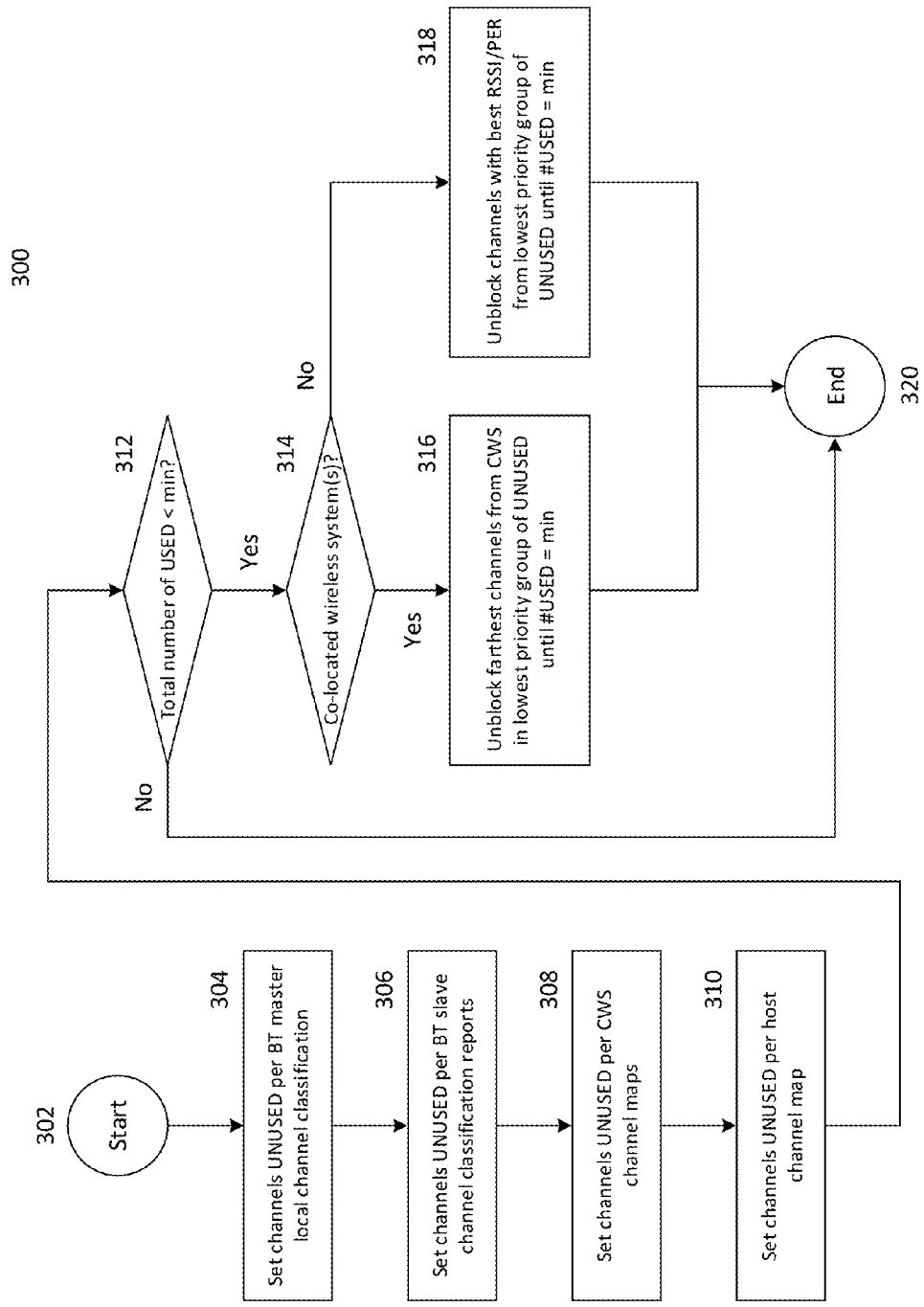
FIG. 3 shows a flow chart illustrating a Bluetooth channel unblocking scheme.

FIG. 3 shows a flow chart illustrating method 300, which may be executed by processing circuit 204b to determine the set of USED channels. Processing circuit 204b may thus retrieve and execute program code (corresponding to software and/or firmware modules) which may cause processing circuit 204b to operate in accordance with method 300.

Method 300 may initiate at 302. In 304, BT master 204 may select one or more channels of the available Bluetooth channel pool to set as UNUSED based on local channel classification at BT master 204. For example, BT master 204 may perform channel estimation (e.g. at RF/PHY 204a) prior to start 302 in order to obtain channel quality metrics on one or more channels of the available Bluetooth channel pool, such as by analyzing data received from one or more BT slaves to obtain RSSI and/or PER metrics (channel quality metrics) for each of the one or more channels. BT master 204 may then tentatively assign each of the one or more channels to the set of USED channels or the set of UNUSED channels based on the channel quality metrics. For example, BT master 204 may compare each of the channel quality metrics to one another and/or to a channel quality threshold in order to decide whether to assign each associated channel to the set of USED channels or the set of UNUSED channels.

BT master 204 may then select one or more channels of the available Bluetooth channel pool to set as UNUSED based on BT slave channel classification reports in 306. For example, BT master 204 may receive channel classification reports from one or more BT slaves, where each channel classification report may indicate channel quality for one or more channels of the available Bluetooth channel pool. For example, a BT slave may perform local channel estimation, such as by performing RSSI and/or PER measurements, and may designate each reported channel as GOOD (acceptable channel quality), BAD (unacceptable channel quality), or UNKNOWN (not measured/not enough information), such as by comparing the RSSI and/or PER measurements for each associated channel to one another or to a threshold. BT master 204 may receive the channel classification report and determine the channel classification for each reported channel provided by the BT slave. BT master 204 may e.g. assign each GOOD reported channel to the set of USED channels and each BAD reported channel to the set of UNUSED channels. BT master 204 may e.g. assign each UNKNOWN reported channel to the set of USED channels or alternatively may e.g. assign each UNKNOWN reported channel to the set of UNUSED channels.

BT master 204 may then select one or more channels of the available Bluetooth channel pool to set as UNUSED per co-located wireless system (CWS) channel maps. As previously detailed regarding FIG. 2, BT master 204 may be co-located within mobile device 200 with one or more co-located wireless systems (CWS) 208. For example, CWS 208 may include LTE subsystem 208a and WiFi subsystem 208b. It is appreciated that LTE subsystem 208a and WiFi subsystem 208b may each respectively include one or more transceiver systems and one or more baseband systems (such as e.g. a baseband modem) configured to respectively perform LTE and WiFi wireless communications. LTE subsystem 208a and WiFi subsystem 208b may each respectively include at least one control circuit such as a processor or controller configured to control operation of LTE subsystem 208a and WiFi subsystem 208b in accordance with LTE and WiFi communication standards.

Accordingly, BT master 204 may select one or more channels to set as UNUSED based on CWS channel maps. For example, LTE subsystem 208a and WiFi subsystem 208b may each identify one or more channels that are currently (or e.g. frequently) in use by LTE subsystem 208a and WiFi subsystem 208b, such as by identifying carrier channels (e.g. by center frequency and/or frequency band) that are currently in use for LTE and/or WiFi transmission. It is appreciated that carrier channels that are currently used for LTE and/or WiFi reception may also be denoted in the CWS channel map; however, channels occupied for LTE and/or WiFi transmission may be emphasized due to the appreciably greater interference caused by co-located wireless transmission.

LTE subsystem 208a may then provide a CWS channel map indicating the channels occupied for LTE transmission (and/or reception). For example, LTE subsystem 208a may provide the CWS channel map to shared memory 206, which may store the CWS channel map. As shown in FIG. 2, BT master 204 and CWS 208 may both have access to shared memory 206. Accordingly, BT master 204 may access shared memory 206 in order to retrieve the CWS channel map provided by LTE subsystem 208a.

Similarly, WiFi subsystem 208b may provide a CWS map indicating the channels occupied for WiFi transmission (and/or reception). For example, WiFi subsystem 208b may provide the CWS channel map to shared memory 206, which may store the CWS channel map. BT master 204 may then access shared memory 206 in order to retrieve the CWS channel map provided by LTE subsystem 208b.

Shared memory 206 may thus provide a medium for BT master 204 and CWS 208 to exchange information such as CWS channel maps. Alternatively, BT master 204 may directly exchange information with CWS 208, such as with a direct interface. Alternatively, BT master 204 and CWS 208 may exchange information via an upper-layer component of mobile device 200, such as through the host device. It is appreciated that alternative mediums may be provided for BT master 204 and CWS 208 to exchange information including channel maps, such as a direct interface or an indirect interface via a host layer of mobile device 200.

BT master 204 may thus have one or more CWS channel maps available at 308. BT master 204 may then select one or more channels of the available Bluetooth channel pool to set as UNUSED based on the one or more CWS channel maps.

For example, BT master 204 may select each channel indicated as occupied by LTE and WiFi transmission (and/or reception) by the CWS channel maps to set as UNUSED. As detailed regarding FIG. 1, certain LTE and WiFi frequency subbands may overlap with or fall substantially proximate to the Bluetooth operating band (e.g. dependent on the particular frequency allocation). Referring to FIG. 1, the WiFi CWS channel map provided by WiFi subsystem 208b may indicate that WiFi subsystem 208b is currently employing one or more sections of the WiFi operating band for WiFi transmission (and/or reception), i.e. occupied WiFi frequency bands. Accordingly, BT master 204 may set the channels of the available Bluetooth channel pool corresponding to the occupied WiFi frequency bands to UNUSED in 308, as co-located WiFi transmission on overlapping frequencies may significantly interfere with Bluetooth transmission and (in particular) reception.

Similarly, the CWS channel map provided by LTE subsystem 208a may indicate that LTE subsystem 208a is currently employing one or more sections of the LTE operating band for LTE transmission (and/or reception), i.e. occupied LTE frequency bands. Depending on the particular frequency spectrum licensing allocation (e.g. as detailed regarding FIG. 1), the occupied LTE frequency bands may fall substantially proximate to the Bluetooth operating band (as shown in FIG. 1) or may overlap with the Bluetooth operating band (not shown). Accordingly, in the event that the occupied LTE frequency bands overlap with the Bluetooth operating band, BT master 204 may set the channels of the available Bluetooth channel pool corresponding to the occupied LTE frequency bands to UNUSED in 308, as co-located LTE transmission on overlapping frequencies may significantly interfere with Bluetooth transmission and (in particular) reception.

BT master 204 may then select one or more channels of the available Bluetooth channel pool to set to UNUSED based on the host channel map in 310. As previously indicated, the host channel map may be provided by a higher-layer component of mobile device 200, and may indicate one or more channels that are not suitable for use. Accordingly, BT master 310 may similarly set the channels of the available Bluetooth channel pool that correspond to the one or more channels indicated as unsuitable for use by the host channel map to UNUSED in 310.

In addition to setting one or more of the available Bluetooth channels to UNUSED, BT master 204 may also assign a blocking priority to each of the channels in the set of UNUSED channels in 304-310. For purposes of the following explanation, a high blocking priority may indicate that an UNUSED channel is heavily weighted against being unblocked, while a low blocking priority may indicate that an UNUSED channel is lowly weighted against being unblocked.

BT master 204 may assign blocking priorities to each UNUSED channel based on the reason each UNUSED channel is assigned to the set of UNUSED channels. For example, BT master 204 may designate blocking priorities based on whether each UNUSED channel is assigned to the set of UNUSED channels due to local channel classification, channel classification reports, CWS channel maps, or host channel maps.

Figure 4:
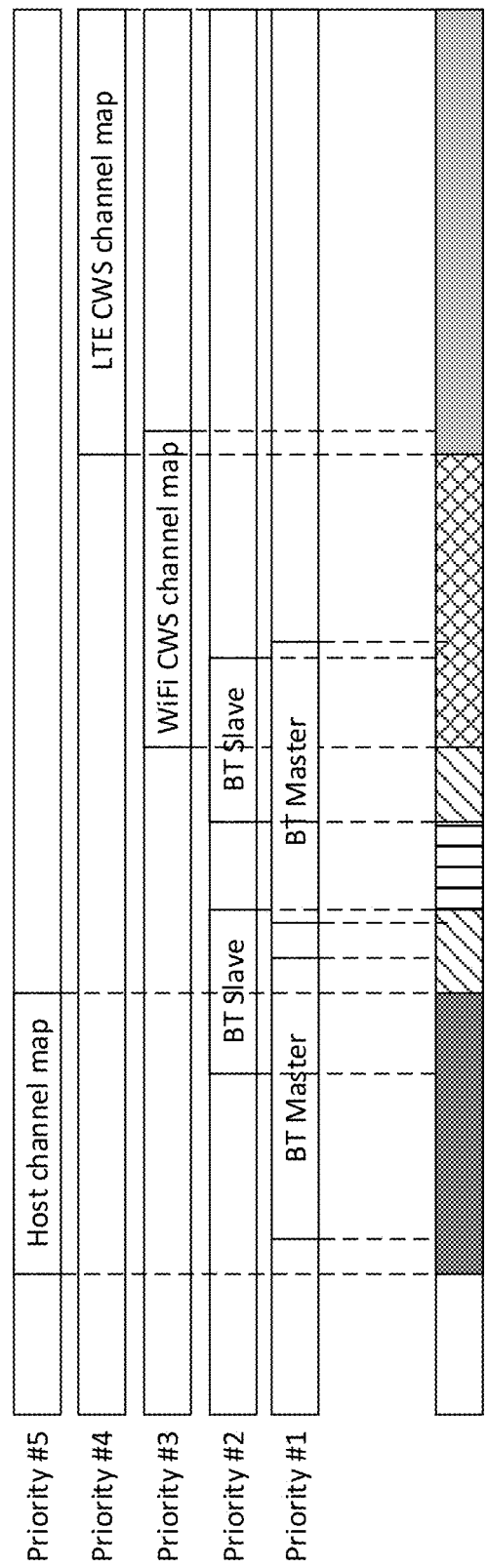
FIG. 4 shows a frequency chart illustrating Bluetooth channel blocking priority.

FIG. 4 shows an exemplary channel blocking priority hierarchy. As shown in FIG. 4, BT master 204 may designate Priority #5, the highest blocking priority, to UNUSED channels that are set to UNUSED as a result of a host channel maps (310). BT master may designate Priority #4 to UNUSED channels that are set to UNUSED as a result of LTE CWS channel maps (308). BT master 204 may designate Priority #3 to UNUSED channels that are set to UNUSED as a result of WiFi CWS channel maps (308). BT master 204 may designate Priority #2 to UNUSED channels that are set to UNUSED as a result of BT slave channel classification reports (306). BT master 204 may designate Priority #1, the lowest blocking priority, to UNUSED channels that are set to UNUSED as of local channel classification at BT master 204 (304). It is appreciated that BT master 204 may designate blocking priorities during UNUSED channel assignment in 304-310 or may designate blocking priorities after UNUSED channel assignment. Furthermore, it is understood that the blocking priority detailed in FIG. 4 is exemplary, and that numerous alternative blocking priority hierarchies may be employed.

Accordingly, BT master 204 may determine the set of UNUSED channels in 304-310, which may be based on local channel estimates, channel classification reports, and channel maps. BT master 204 may additionally designate a blocking priority to each UNUSED channel. It is appreciated that 304-310 may be performed in any sequence in order to determine the set of UNUSED channels. Furthermore, it is appreciated that BT master 204 may combine aspects of the analyses in 304-310 to determine the set of UNUSED channels. For example, one or more channels of the available Bluetooth channel pool may warrant UNUSED status due to multiple of 304-310, e.g. when a particular channel is indicated as occupied by a WiFi CWS channel map and indicated as BAD in a BT slave channel classification reports. It is appreciated that BT master 204 may set a given channel to UNUSED if the given channel fails the analysis of any one of 304-310, or may alternatively set a given channel to UNUSED if the given channel fails the analysis of multiple of 304-310.

It is understood that BT master 204 may assign blocking priorities to one or more of set of UNUSED channels in numerous alternative ways. As previously detailed, processing circuit 204b may be configured to execute program code for software and/or firmware modules to control the operation of BT master 204 in accordance with a BT scheme. The software and/or firmware modules of processing circuit 204b may thus have one or more data structures available during execution of such program code, where each data structure contains characterization information of each channel of the available Bluetooth channel pool. The software and/or firmware modules of processing circuit 204b may thus be configured to change a blocking priority property of each data structure to reflect the blocking priority assigned to each UNUSED channel. Alternatively, the software and/or firmware modules of processing circuit 204b may provide a table that maps identification information of each channel of the available Bluetooth channel pool to an assigned blocking priority, and may change the blocking priorities in the table to reflect assigned blocking priorities. Such procedures are considered exemplary, and alternative methodologies may alternatively be used to assign blocking priorities to channels.

BT master 204 may also obtain the set of USED channels at 310, which may be the channels of the available Bluetooth channel pool that are not set to UNUSED in 304-310. In accordance with an AFH scheme implemented in a Bluetooth system, BT master 204 may need to have a minimum number of USED channels to employ in the AFH scheme. Accordingly, BT master 204 may determine in 312 whether the number of USED channels in the set of USED channels is less than the minimum number of USED channels. If the number of USED channels is greater than or equal to the minimum number of USED channels, BT master 204 may proceed to end 320, and may subsequently employ the set of USED channels to transmit and/or receive data with one or more BT slaves, such as in an AFH scheme.

If BT master 204 determines that the number of USED channels is less than the minimum number of USED channels in 312, BT master 204 may need to re-assign one or more channels from the set of UNUSED channels to the set of USED channels in order to obtain the minimum number of USED channels, i.e. may need to unblock one or more UNUSED channels.

Accordingly, BT master 204 may then determine whether any co-located wireless systems exist in 314. If there are no co-located wireless systems present in mobile device 200, BT master 204 may unblock channels from the set of UNUSED channels based on RSSI and/or PER metrics and blocking priority in 318, as will be detailed below following the description of 316. If co-located wireless systems exist (e.g. in the case of LTE subsystem 208a and WiFi subsystem 208b in FIG. 2), BT master 204 may unblock UNUSED channels based on the frequency distance of each channel from the channels occupied by the co-located wireless systems in 316. BT master 204 may additionally unblock UNUSED channels based on blocking priority in 316.

For example, BT master 204 may unblock UNUSED channels by identifying and unblocking UNUSED channels that are located furthest from the channels occupied by the co-located wireless systems. As previously indicated, Bluetooth channels that overlap with or are substantially proximate to an occupied co-located wireless system channel may experience significant interference, in particular when the co-located wireless system is transmitting. Accordingly, BT master 204 may desire to unblock UNUSED channels that are distant from the occupied co-located wireless system channels in order to unblock channels with minimal interference, thus re-assigning channels with minimal interference to the set of USED channels.

BT master 204 may thus include software and/or firmware modules that, when executed on a processor, may be configured to determine the frequency distance between at least two channels. For example, processing circuit 204b may be configured to retrieve program code from a memory component of BT master 204 (not explicitly shown in FIG. 2) corresponding to software and/or firmware modules. Processing circuit 204b may be configured to compare the frequencies of at least two channels. For example, processing circuit 204b may be configured to compare the frequencies of two center frequencies, two frequency bands, or a center frequency and a frequency band. In order to identify the UNUSED channel that is furthest from occupied CWS channels, processing circuit 204b may be configured to compare the frequencies of each UNUSED channel (center frequency or frequency band) to the frequencies of each occupied CWS channel (center frequency or frequency band) as indicated by CWS channel maps, such as by calculating the difference between each set of compared frequencies. Processing circuit 204b may then be configured to compare the difference of each set of compared frequencies in order to identify the UNUSED channel that is furthest from any occupied CWS channel, i.e. the UNUSED channel that has the greatest separation (indicated by the difference) between some or all of the occupied CWS channels. Processing circuit 204b may then unblock the identified channel by re-assigning the identified UNUSED channel to the set of USED channels. BT master 204 may thus be configured to identify and unblock the UNUSED channel with the greatest frequency separation between some or all of the occupied CWS channel, and may be configured to continue to do so (based on blocking priority group) until the set of USED channels contains at least the minimum number of USED channels.

Returning to FIG. 3, BT master 204 may identify and unblock UNUSED channels based on distance from occupied CWS channels in 316, such as by identifying and unblocking the UNUSED channels that are located furthest from CWS channels that are occupied by LTE and/or WiFi. BT master 204 may identify such channels by analyzing CWS channel maps provided by LTE subsystem 208a and/or WiFi subsystem 208b and comparing the center frequencies or frequency bands of each occupied channel indicated by the CWS channel maps to the center frequencies or frequency bands of the UNUSED channels. BT master 204 may then unblock, i.e. re-assign to the set of USED channels, the UNUSED channels separated from the occupied CWS channels by the greatest distance in frequency until the set of USED channels contains at least the minimum number of USED channels.

Alternatively, BT master 204 may identify and unblock UNUSED channels based on both distance from occupied CWS channels and blocking priority in 316. As previously detailed, BT master 204 may assign each UNUSED channel a blocking priority, e.g. from Priority #1 to Priority #5, where the assigned blocking priorities may be designated based on the reason for assigning each UNUSED channel to the set of UNUSED channels.

Accordingly, BT master 204 may first consider the UNUSED channels with the lowest blocking priority for unblocking. For example, BT master 204 may first consider the UNUSED channels with Priority #1, which may be blocked as a result of BT master channel classification in 304, e.g. based on local channel estimates at BT master 204. Accordingly, BT master 204 may identify and unblock the UNUSED channels that are furthest from the occupied CWS channels, such as by identifying the UNUSED channels furthest in frequency distance from occupied CWS channels and re-assigning these UNUSED channels to the set of USED channels until the set of USED channels contains at least the minimum number of USED channels.

If BT master 204 unblocks all of the UNUSED channels with Priority #1 and the set of USED channels still does not contain at least the minimum number of USED channels, BT master 204 may proceed to the UNUSED channels with Priority #2, which may be blocked as a result of BT slave channel classification reports in 306. Similarly to the UNUSED channels with Priority #1, BT master 204 may identify and unblock the UNUSED channels that are furthest from the occupied CWS channels in frequency. BT master 204 may continue to unblock UNUSED channels that are furthest from the occupied CWS channels and re-assign these UNUSED channels to the set of USED channels until the set of USED channels contains at least the minimum number of USED channels. BT master 204 may continue to unblock UNUSED channels with increasing blocking priority (e.g. Priority #2, Priority #3, Priority #4, Priority #5) until the set of USED channels contains at least the minimum number of USED channels.

BT master 204 may identify the UNUSED channel with the absolute furthest distance from any occupied CWS channel along the frequency axis as the next UNUSED channel with a given blocking priority to unblock at any given time. Alternatively, BT master 204 may be configured to calculate the frequency distance between two given channels, such as by determining the frequency distance between two center frequencies, two frequency bands, and/or a center frequency and a frequency band. Accordingly, BT master 204 may utilize the available Bluetooth channel pool and the CWS channel maps to determine the frequency distance between a given UNUSED channel and each occupied CWS channel. BT master 204 may thus identify the UNUSED channel furthest from any occupied CWS channel and select this UNUSED channel to unblock.

As detailed below regarding FIG. 5, BT master 204 may also be configured to utilize predefined information about frequency spectrum licensing to determine which UNUSED channels in a given blocking priority group to unblock.

FIG. 5 shows a chart illustrating a channel unblocking hierarchy chart, which may address a frequency spectrum licensing scheme such as depicted in FIG. 4. It is appreciated that the frequency spectrum licensing scheme shown in FIG. 4 is exemplary, and may not specifically correspond to a real-world scenario.

BT master 204 may employ a channel unblocking hierarchy similar to as shown in FIG. 5 for UNUSED channel unblocking in 316 of method 300. However, it is appreciated that the channel unblocking hierarchy may need to be adjusted dependent on the relative locations of the Bluetooth operating band and any CWS operating bands.

As depicted in FIG. 4, the occupied LTE channels may be located at the upper end of the frequency spectrum, i.e. at higher frequencies. The occupied WiFi channels may be located at lower frequencies than the occupied LTE channels. The available Bluetooth channel pool may overlap with the WiFi operating band, and accordingly one or more of the occupied WiFi channels may fall within the available Bluetooth channel pool.

As shown in FIG. 4, BT master 204 may set two bands of channels to UNUSED based on local channel classification at BT master 204, such as by analyzing RSSI and/or PER measurements, which BT master 204 may designate as Priority #1 (lowest blocking priority). BT master 204 may additionally set two bands of channels to UNUSED based on BT slave channel classification reports, such as by analyzing GOOD/BAD/UNKNOWN designations provided by one or more BT slaves, which BT master 204 may designate as Priority #2. BT master 204 may also set a single band of channels as UNUSED based on a WiFi CWS channel map provided by WiFi subsystem 208b, which BT master 204 may designate as Priority #3. BT master 204 may set a single band of channels as UNUSED based on an LTE CWS channel map provided by LTE subsystem 208a, which BT master 204 may designate as Priority #4. BT master 204 may set a single band of channels as UNUSED based on a host channel map provided by a higher-layer host component, which BT master 204 may designate as Priority #5 (highest blocking priority). It is appreciated that this scenario is exemplary.

As shown in FIG. 4, the LTE operating band may be located at higher frequencies than the Bluetooth operating band, while the WiFi operating band may substantially overlap with the Bluetooth operating band. Accordingly, one or more occupied WiFi channels may fall within the available Bluetooth channel pool. While the LTE channels may be located at higher frequencies than the available Bluetooth channel pool, these LTE channel may nevertheless cause significant interference on upper Bluetooth channels that are substantially proximate to an occupied LTE channel.

BT master 204 may rely on the predefined locations of the LTE and WiFi operating bands to select UNUSED channels to unblock for each blocking priority group in 316 of method 300. For example, BT master 204 may first evaluate the UNUSED channels with Priority #1 for unblocking, where the UNUSED channels with Priority #1 are initially set to UNUSED based on BT master local channel classification. As the occupied WiFi channels are located at the upper end of the Bluetooth operating band, BT master 204 may select the Priority #1 UNUSED channels farthest from the occupied WiFi channels to unblock first, i.e. the Priority #1 UNUSED channels at the lowest frequencies. Additionally, as the LTE operating band (and accordingly all occupied LTE channels) are located at higher frequencies than the Bluetooth operating band, by unblocking the Priority #1 channels at the lowest frequencies BT master 204 may unblock UNUSED channels that additionally are distant from all occupied LTE channels. Due to the distance from occupied CWS channels, the unblocked UNUSED channels may suffer from reduced interference, and accordingly may not significantly degrade performance of an AFH scheme if utilized therein.

BT master 204 may continue to unblock Priority #1 UNUSED channels until the set of USED channels contains at least the minimum number of USED channels or the all of the Priority #1 UNUSED channels are unblocked. Depending on the initial number of channels in the set of USED channels, BT master 204 may eventually unblock all Priority #1 UNUSED channels, and may consequently move to the Priority #2 UNUSED channels to continue channel unblocking procedures in 316.

Similarly to the Priority #1 UNUSED channels, BT master 204 may unblock Priority #2 UNUSED channels at the far end of the occupied WiFi channels, i.e. the Priority #2 UNUSED channels at lower frequencies. BT master 204 may continue unblocking Priority #2 UNUSED channels until the set of USED channels contains at least the minimum number of USED channels or until all of the Priority #2 UNUSED channels are unblocked.

If BT master 204 unblocks all of the Priority #2 UNUSED channels and the set of USED channels still has fewer than the minimum number of USED channels, BT master 204 may begin unblocking Priority #3 UNUSED channels, which may be blocked due to occupied WiFi channels indicated in the WiFi channel map. As the LTE operating band is located at the upper end of the WiFi operating band, BT master 204 may first begin unblocking the Priority #3 UNUSED channels that are located farthest from the occupied LTE channels, i.e. the Priority #3 UNUSED channels at the lowest frequencies. Accordingly, BT master 204 may unblock UNUSED channels that are distant from the occupied LTE channels, which may have reduced interference from occupied LTE channels (although may have interference from occupied WiFi channels according to the Priority #3 assignment). Additionally, as the LTE operating band is licensed spectrum compared to the unlicensed WiFi operating band, BT master 204 may attempt to minimize potential interference on LTE channels at the expense of increased interference on WiFi channels.

If BT master 204 unblocks all Priority #3 UNUSED channels and the set of USED channels still has fewer than the minimum number of USED channels, BT master 204 may begin unblocking Priority #4 UNUSED channels, which may be blocked due to occupied LTE channels indicated in the LTE channel map. It is understood that depending on the particular frequency spectrum licensing, none, some, or all of the Bluetooth operating band may overlap with the LTE operating band. In the event that at least some of the Bluetooth operating band overlaps with the LTE operating band, BT master 204 may assign Priority #4 to one or more UNUSED channels.

Accordingly, BT master 204 may begin unblocking Priority #4 UNUSED channels in 316 if the set of USED channels does not contain at least the minimum number of USED channels after the Priority #1-#3 UNUSED channels have been unblocked. As the Priority #4 channels may fall within the occupied LTE channels, BT master 204 may attempt to first unblock Priority #4 channels that will have less interference than other Priority #4 channels. Accordingly, BT master 204 may first unblock Priority #4 UNUSED channels located at the far ends of the LTE center frequency of the occupied LTE channels, and may gradually unblock Priority #4 UNUSED channels located toward the middle of the occupied LTE channels. BT master 204 may continue to unblock Priority #4 UNUSED channels until the set of USED channels contains at least the minimum number of USED channels or all of the Priority #4 UNUSED channels are unblocked.

If the set of USED channels does not contain at least the minimum number of USED channels after all of the Priority #4 UNUSED channels are unblocked, BT master 204 may begin unblocking Priority #5 UNUSED channels, which may be blocked due to a host channel map. As all of the Priority #1-#4 UNUSED channels will be unblocked, BT master 204 may unblock Priority #5 UNUSED channels based on RSSI and/or PER measurements obtained during local channel classification at BT master 204. For example, BT master 204 may first unblock Priority #5 UNUSED channels with the strongest RSSI and/or PER measurements, and may gradually proceed to unblock Priority #5 UNUSED channels with weaker RSSI and/or PER measurements until the set of USED channels contains at least the minimum number of USED channels.

Accordingly, BT master 204 may unblock the farthest UNUSED channels from any occupied CWS channels in the lowest available blocking priority assignment (i.e. the lowest priority blocking assignment that contains UNUSED channels) in 316, and may continue to unblock the farthest UNUSED channels from any occupied CWS channels in the lowest available blocking priority assignment until the set of USED channels contains at least the minimum number of USED channels.

It is appreciated that BT master 204 may be configured to utilize other alternative procedures to identify channels of the set of UNUSED channels that are farthest in frequency distance from the occupied CWS channels. For example, BT master 204 may be configured to identify an occupied CWS channel that is closest to all of the set of UNUSED channels, such as e.g. the lowest-frequency occupied LTE channel indicated in the LTE CWS channel map as shown in FIG. 4. As opposed to comparing a center frequency or frequency band of each of the set of UNUSED channels to a center frequency or frequency band of each of the occupied LTE channels, BT master 204 may instead compare a center frequency or frequency band of each of the set of UNUSED channels to a center frequency or frequency band of the lowest-frequency occupied LTE (or e.g. any CWS) channel, e.g. based on prior knowledge of the placement of the LTE (or e.g. any CWS) operating band relative to the Bluetooth operating band (as shown in FIG. 4). Furthermore, BT master 204 may be configured to identify the lowest-frequency UNUSED channel as the farthest UNUSED channel from the occupied CWS channels e.g. based on prior knowledge of the placement of the CWS operating band relative to the Bluetooth operating band (as shown in FIG. 4). It is appreciated that such decisions may be configured based on the particular frequency spectrum licensing scheme, and may be configured to operate in a number of different frequency spectrum licensing schemes.

Returning to method 300 of FIG. 3, if BT master 204 determines in 314 that there are not any co-located wireless systems, BT master 204 may unblock UNUSED channels with the strongest RSSI and/or PER metrics (as obtained during local channel classification by BT master 204) in the lowest available blocking priority assignment in 318. As there are not any co-located wireless systems, BT master 204 may only be unblocking from Priority #1, #2, and #5 assignments, as Priority #4 and #5 are reserved for occupied CWS channels. Accordingly, BT master 204 may analyze each UNUSED channel in the lowest available blocking priority assignment and continue to unblock UNUSED channels in the lowest available blocking priority assignment based on RSSI and/or PER until the set of USED channels contains at least the minimum number of USED channels or until the all of the lowest available blocking priority assignment are unblocked. BT master 204 may continue with the new lowest available blocking priority assignment, and so forth.

Method 300 may terminate at 320, at which point BT master 204 may have the set of USED channels to apply to transmit and/or receive data, such as with one or more BT slaves in accordance with an AFH transmission scheme.

Although method 300 depicts a two-part process including separate tentative blocking and unblocking tasks, BT master 204 may alternatively perform method 300 in a single-part blocking process. For example, BT master 204 may alternatively assign each channel of the available Bluetooth channel pool a blocking priority based on local channel classification, channel classification reports, CWS channel maps, and host channel maps (e.g. 304-310 without setting any channels UNUSED). BT master 204 may then begin selecting channels for the set of USED channels based on one or more of blocking priority, frequency distance from occupied CWS channels, and local channel estimates as detailed above. BT master 204 may continue to select channels for the set of USED channels until the set of USED channels contains at least the minimum number of USED channels (or e.g. a quantity of channels greater than the minimum number of USED channels). It is understood that all such processes include selecting channels for the set of USED channels based on one or more of blocking priority, frequency distance from occupied CWS channels, and local channel estimates.

In an alternative implementation of method 300, BT master 204 may additionally apply RSSI and/or PER metrics during the UNUSED channel unblocking procedure in 316, i.e. when one or more co-located wireless systems are present. For example, BT master 204 may unblock the farthest UNUSED channels from the lowest available blocking priority assignment that exceed an RSSI and/or PER threshold, i.e. by utilizing more than one criteria (RSSI/PER and occupied channel frequency separation) to identify UNUSED channels to unblock from the lowest available blocking priority assignment. It is appreciated that BT master 204 may apply multiple criteria in a variety of different manners, such as by only unblocking UNUSED channels if the RSSI and/or PER metric for a given UNUSED channel exceeds the RSSI and/or PER threshold, i.e. regardless of frequency distance from an occupied CWS channel. Alternatively, BT master 204 may weight each of the RSSI/PER and frequency distance criteria, such as by applying a formula taking into account both RSSI and/or PER (e.g. in relation to a RSSI/PER threshold) and frequency distance from occupied CWS channels.

In a further alternative implementation of method 300, BT master 204 may not apply RSSI and/or PER metrics during the UNUSED channel unblocking procedure in 316, and accordingly may rely only on frequency distance from occupied CWS channels. Such may save substantial time, power, and reduce computational load due to the reduced activity of RF/PHY 204a, as BT master 204 may additionally not perform any measurements for local channel classification in 304 of method 300.

Accordingly, due to the absence of channel quality metrics for local channel classification, BT master 204 may only utilize blocking priority assignments Priority #2-#5. Additionally, BT master 204 may determine UNUSED channel unblocking decisions in 316 based solely on frequency distance of each UNUSED channel from occupied CWS channels, such as detailed regarding FIG. 5. Accordingly, BT master 204 may identify and unblock the UNUSED channel from the lowest available blocking priority assignment that is farthest from any occupied CWS channels (as determined by CWS channel maps). BT master 204 may continue to unblock UNUSED channels in the lowest available blocking priority assignment. Depending on the number of UNUSED channels in each blocking priority assignment, BT master 204 may eventually begin to consider unblocking Priority #5 UNUSED channels. As BT master 204 may not have any RSSI and/or PER metrics available to identify which Priority #5 UNUSED channels to unblock, BT master 204 may instead select Priority #5 UNUSED channels to unblock on an arbitrary basis, such as by selecting the UNUSED channel with the smallest channel index (i.e. lowest frequency) first and continuing to unblock UNUSED channels with increasing channel indices until the set of USED channels contains at least the minimum number of USED channels. As BT master 204 may avoid performing radio measurements to obtain channel quality metrics, BT master 204 may save time, power, and reduce computational load due to the reduced activity of RF/PHY 204a. Accordingly, BT master 204 may not need to perform or utilize local channel estimates if CWS channel maps are available.

In a further alternative implementation of method 300, BT master 204 may begin determining the set of USED channels before local channel estimation is complete, i.e. before radio measurements to obtain RSSI and/or PER metrics for each channel are complete. For example, BT master 204 may begin setting channels UNUSED in 306-308 before local channel estimation to obtain RSSI and/or PER is complete, and accordingly may skip setting channels UNUSED based on BT master local channel classification at 304. BT master 204 may continue to determine the set of USED channels in 314-320 without delaying until the local channel estimation is complete, such as by utilizing frequency distances and blocking priority assignments as detailed above. Upon completion of the local channel estimation, BT master 204 may apply the obtained RSSI and/or PER measurements as a secondary criteria in unblocking UNUSED channels, such as detailed above.

In a further alternative implementation of method 300, BT master 204 may not assign blocking priorities to any UNUSED channels, and instead may treat all UNUSED channels as equal blocking priority. BT master 204 may then unblock UNUSED channels based solely on frequency distance from occupied CWS channels in 316 (or based on frequency distance and RSSI and/or PER) and solely on RSSI and/or PER in 318, e.g. depending on the presence of co-located wireless systems in 314. However, it is appreciated that blocking priority assignment may improve performance by selectively unblocking UNUSED channels.

It is appreciated that BT master 204 may execute method 300 in an iterative fashion, such as by periodically repeating method 300 based on updated local channel classifications, BT slave channel classification reports, CWS channel maps, and/or host channel maps. For example, BT master 204 may perform a new local channel classification, such as by performing a new local channel estimation procedure to obtain new RSSI and/or PER metrics. Additionally or alternatively, BT master 204 may receive one or more new BT slave channel classification reports. Additionally or alternatively, BT master 204 may receive a new CWS channel map, such as by retrieving a new LTE channel map and/or WiFi channel map from shared memory 206 from LTE subsystem 208a and/or WiFi subsystem 208b, respectively. Additionally or alternatively, BT master 204 may receive a new host channel map. BT master 204 may then repeat some or all of method 300 to update the set of USED channels and set of UNUSED channels. BT master 204 may then apply the set of USED channel to transmit and/or receive data, such as in an AFH scheme with one or more BT slaves.

Figure 6:
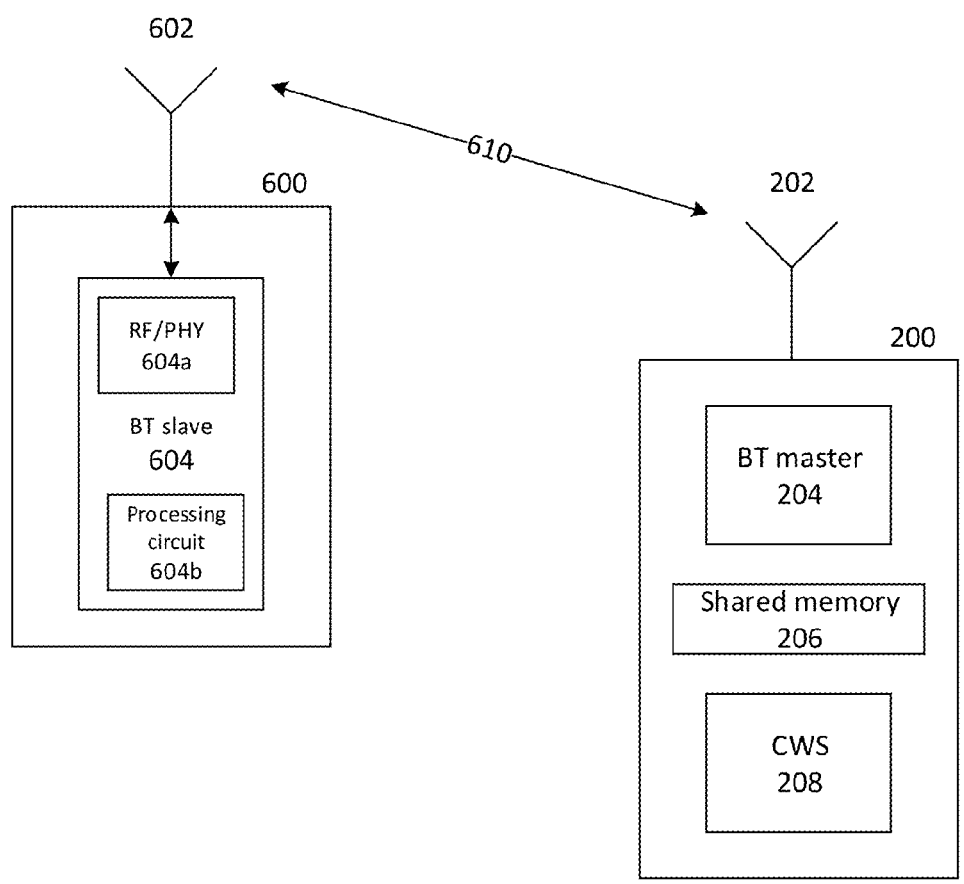
FIG. 6 shows a multi-mode radio communication system including two mobile devices.

FIG. 6 shows a multi-mode radio communication system including mobile device 200 and mobile device 600. As previously detailed regarding FIG. 2, mobile device 200 may include BT master subsystem 204 and CWS 208, where CWS 208 may include LTE subsystem 208a and WiFi subsystem 208b.

Mobile device 600 may include antenna 602 and BT slave subsystem 604, which may be composed of RF/PHY 604a and processing circuit 604b. It is appreciated that RF/PHY 604a and processing circuit 604b may function similarly to counterpart RF/PHY 204a and processing circuit 204b of BT master subsystem 204. However, RF/PHY 604a and processing circuit 604b may instead be configured to operate in accordance with a Bluetooth slave role. Accordingly, processing circuit 604b may be configured to retrieve (e.g. from a memory component of mobile device 600) and execute program code for software and/or firmware modules, which when executed by processing circuit 604b may cause processing circuit 604b to operate in accordance with a Bluetooth slave protocol, which may be controlled via control signaling received from BT master subsystem 204. Processing circuit 604b may control RF/PHY 604a to transmit and receive wireless signals in accordance the Bluetooth slave protocol.

Mobile device 200 may be configured to wirelessly communicate with mobile device 600 over air interface 610. Accordingly, BT master subsystem 204 may be configured to transmit and receive data with BT slave subsystem 604 using air interface 610. For example, BT master subsystem 204 may select a set of USED channels, e.g. as detailed above, and employ an AFH scheme to transmit and receive data with BT slave subsystem 604 over air interface 610. BT master subsystem 204 may transmit control signaling to BT slave subsystem 604 that indicates the set of USED channels to be employed in the AFH scheme and e.g. any additional control information needed to execute the AFH scheme. BT master subsystem 204 may then wirelessly exchange data with BT slave subsystem 604 over air interface 610 according to the specified AFH scheme.

As previously indicated, BT slave subsystem 604 may be configured to perform channel classification and transmit a channel classification report to BT master subsystem 204. For example, RF/PHY 604a may perform local channel estimation and provide the channel estimation results to processing circuit 604b. Processing circuit 604b may then generate a channel classification report, such as by denoting one or more channels of the available Bluetooth channel pool as GOOD, BAD, or UNKNOWN. Processing circuit 604b may then transmit the channel classification report to BT master subsystem 204, which may apply the channel classification report to determine the set of USED channels to be used in an AFH scheme. For example, BT master subsystem 204 may utilize the channel classification report to tentatively block one or more channels of the available Bluetooth channel pool (i.e. tentatively assign to the set of UNUSED channels) in addition to assigning a blocking priority to one or more of the set of UNUSED channels. BT master subsystem 204 may then utilize the blocking priority, in addition to other information as previously detailed, to determine the set of USED channels.

Mobile devices 200 and 600 may be considered a multimode radio communication system comprising a Short Range radio communication master subsystem (BT master 204), Short Range radio communication slave subsystem (BT slave 604), and Cellular Wide Area radio communication subsystem (LTE subsystem 208a), the Short Range radio communication master subsystem including a processing circuit (processing circuit 204b) configured to identify a first plurality of channels accessible to the Short Range radio communication master subsystem, assign a blocking priority to one or more of the first plurality of channels, identify a second plurality of channels occupied by the Cellular Wide Area radio communication subsystem, and select a third plurality of channels from the first plurality of channels based on the blocking priority of the first plurality of channels and the frequency distance between each of the first plurality of channels and each of the second plurality of channels, and a radio transceiver (RF portion of RF/PHY 204a) configured to apply the third plurality of channels to transmit or receive data on a Short Range radio communication network.

As previously indicated, it is appreciated that alternative to the "tentative blocking" (i.e. tentative assignment to the set of UNUSED channels) followed by unblocking (i.e. re-assignment to the set of USED channels), BT master 204 may instead perform a reduced process in which priorities are assigned to one or more of the available Bluetooth channel pool and the set of USED channels are subsequently selected from the available Bluetooth channel pool based on blocking priority and frequency distance from any occupied CWS channels. Accordingly, it is understood that selecting the set of USED channels based on frequency distance from any occupied CWS channels (and/or blocking priority) may include procedures that perform a tentative blocking part as well as procedures that simply select the set of USED channels directly.

Figure 7:
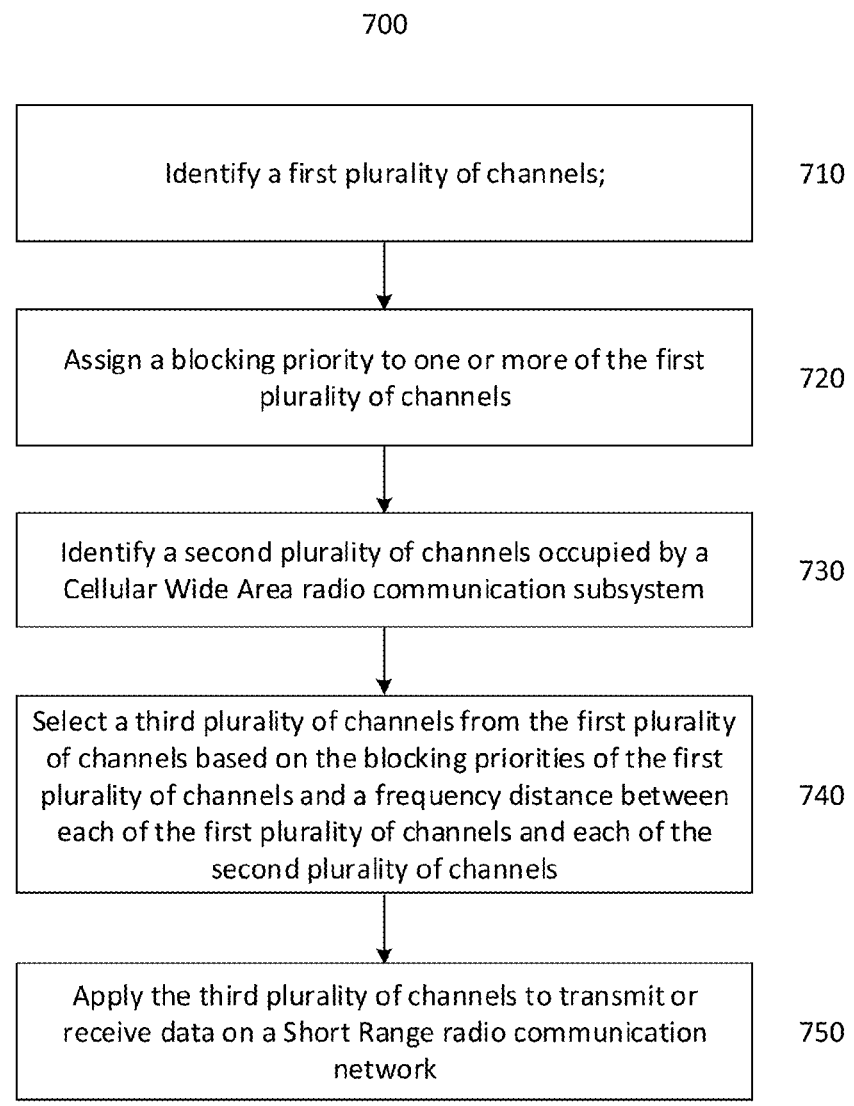
FIG. 7 shows a method in a Short Range radio communication master subsystem.

FIG. 7 shows a flow chart illustrating method 700 for Short Range radio communication in a mobile device. Method 700 includes identifying a first plurality of channels (710), assigning a blocking priority to one or more of the first plurality of channels (720), identifying a second plurality of channels occupied by a Cellular Wide Area radio communication subsystem of the mobile device (730), selecting a third plurality of channels from the first plurality of channels based on the blocking priorities of the first plurality of channels and a frequency distance between each of the first plurality of channels and each of the second plurality of channels (740), and applying the third plurality of channels to transmit or receive data on a Short Range radio communication network (750).

In one or more further exemplary aspects of the disclosure, one or more of the features described above in reference to FIGS. 1-6 may be further incorporated into method 700. In particular, method 700 may be configured to perform further and/or alternate processes as detailed regarding mobile device 200 and any internal components thereof.

It is appreciated that the terms "user equipment", "UE", "mobile terminal", etc., may apply to any wireless communication device, including cellular phones, tablets, laptops, personal computers, and any number of additional electronic devices.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include a one or more components configured to perform each aspect of the related method.

The following Examples pertain to further aspects of the disclosure:

Example 1 is a method for Short Range radio communication in a mobile device, the method including identifying a first plurality of channels, assigning a blocking priority to one or more of the first plurality of channels, identifying a second plurality of channels occupied by a Cellular Wide Area radio communication subsystem of the mobile device, selecting a third plurality of channels from the first plurality of channels based on the blocking priorities of the first plurality of channels and a frequency distance between each of the first plurality of channels and each of the second plurality of channels, and applying the third plurality of channels to transmit or receive data on a Short Range radio communication network.

In Example 2, the subject matter of Example 1 can optionally include wherein the first plurality of channels are carrier channels available to a Short Range radio communication master subsystem of the mobile device for wireless data transmission.

In Example 3, the subject matter of Example 1 or 2 can optionally include wherein the applying the third plurality of channels to transmit or receive data on a Short Range radio communication network includes applying the third plurality of channels to transmit or receive data with a Short Range radio slave device.

In Example 4, the subject matter of Example 1 can optionally include wherein the selecting a third plurality of channels from the first plurality of channels includes selecting at least a predefined quantity of channels from the first plurality of channels as the third plurality of channels.

In Example 5, the subject matter of Example 4 can optionally include wherein the applying the third plurality of channels to transmit or receive data on a Short Range radio communication network includes transmitting or receiving data according to a channel hopping scheme, wherein the predefined quantity of channels is a minimum number of channels needed for the channel hopping scheme.

In Example 6, the subject matter of Example 1 or 4 can optionally include wherein the applying the third plurality of channels to transmit or receive data on a Short Range radio communication network includes transmitting or receiving data using the third plurality of channels according to channel hopping scheme.

In Example 7, the subject matter of Example 6 can optionally include wherein the channel hopping scheme is an Adaptive Frequency Hopping (AFH) scheme.

In Example 8, the subject matter of any one of Examples 1 to 7 can optionally include wherein the Short Range radio communication network is a Bluetooth communication network.

In Example 9, the subject matter of any one of Examples 1 to 8 can optionally further include performing channel estimation for one or more of the first plurality of channels to obtain one or more channel metrics.

In Example 10, the subject matter of Example 8 can optionally include wherein the selecting a third plurality of channels from the first plurality of channels includes selecting the third plurality of channels from the first plurality of channels based on the blocking priorities of the first plurality of channels, the one or more channel metrics, and the frequency distance between each of the first plurality of channels and each of the second plurality of channels.

In Example 11, the subject matter of Example 1 can optionally include wherein the selecting a third plurality of channels from the first plurality of channels based on the blocking priorities of the first plurality of channels and a frequency distance between each of the first plurality of channels and each of the second plurality of channels includes comparing the first plurality of channels with the second plurality of channels to identify one or more selected channels of the first plurality of channels that are separated by a maximum frequency distance from the second plurality of channels, and including the one or more selected channels in the third plurality of channels.

In Example 12, the subject matter of Example 1 can optionally include wherein the comparing the first plurality of channels with the second plurality of channels to identify one or more selected channels of the first plurality of channels that are separated by a maximum frequency distance from the second plurality of channels includes identifying one or more of the first plurality of channels that are located furthest away in frequency from the second plurality of channels as the one or more selected channels.

In Example 13, the subject matter of any one of Examples 1 to 12 can optionally include wherein the selecting a third plurality of channels from the first plurality of channels based on the blocking priorities of the first plurality of channels and the frequency distance between each of the first plurality of channels and each of the second plurality of channels includes selecting one or more of the first plurality of channels that have low blocking priority for the third plurality of channels In Example 14, the subject matter of Example 1 can optionally include wherein the selecting a third plurality of channels from the first plurality of channels based on the blocking priorities of the first plurality of channels and the frequency distance between each of the first plurality of channels and each of the second plurality of channels includes identifying one or selected channels of the first plurality of channel that have low blocking priority, identifying one or more of the selected channels that are separated by a maximum frequency distance from the second plurality of channels, and including the one or more of the first plurality of channels in the third plurality of channels.

In Example 15, the subject matter of any one of Examples 1 to 14 can optionally include wherein the identifying a second plurality of channels occupied by a Cellular Wide Area radio communication subsystem includes obtaining a channel map indicating that the second plurality of channels are actively occupied by the Cellular Wide Area radio communication subsystem.

In Example 16, the subject matter of Example 15 can optionally include wherein the assigning a blocking priority to one or more of the first plurality of channels includes assigning a blocking priority to the one or more of the first plurality of channels based on the channel map.

In Example 17, the subject matter of Example 15 can optionally include wherein the obtaining a channel map indicating that the second plurality of channels are actively occupied by the Cellular Wide Area radio communication subsystem includes obtaining the channel map from a shared memory that is accessible by the Cellular Wide Area radio communication subsystem.

In Example 18, the subject matter of Example 15 can optionally include wherein the channel map indicates that the second plurality of channels are being utilized for wireless transmission by the Cellular Wide Area radio communication subsystem.

In Example 19, the subject matter of any one of Examples 1 to 18 can optionally include wherein the Cellular Wide Area radio communication subsystem is a Long Term Evolution (LTE) communication subsystem.

In Example 20, the subject matter of any one of Examples 1 to 19 can optionally include wherein the assigning a blocking priority to one or more of the first plurality of channels includes for each of the one or more of the first plurality of channels, selecting a selected blocking priority from a predefined plurality of blocking priorities, and assigning the selected blocking priorities to each of the one or more of the first plurality of channels.

In Example 21, the subject matter of any one of Examples 1 to 19 can optionally include wherein the assigning a blocking priority to one or more of the first plurality of channels includes for each of the one or more of the first plurality of channels, selecting a selected blocking priority from a predefined plurality of blocking priorities based on at least one of channel estimation, channel classification reports, or channel maps, and assigning the selected blocking priorities to each of the one or more of the first plurality of channels.

In Example 22, the subject matter of any one of Examples 1 to 21 can optionally further include updating the third plurality of channels based on the blocking priorities of the first plurality of channels and a frequency distance between each of the first plurality of channels and each of the second plurality of channels to obtain a fourth plurality of channels, and applying the fourth plurality of channels to transmit or receive data with the Short Range radio communication slave subsystem.

In Example 23, the subject matter of any one of Examples 1 to 22 can optionally include wherein the mobile device includes the Cellular Wide Area radio communication subsystem and Short Range radio communication master subsystem.

Example 24 is a mobile device including a Short Range radio communication master subsystem and the Cellular Wide Area radio communication subsystem of Example 1, the mobile device configured to perform the method of any one of Examples 1 to 23.

Example 25 is a mobile device including a Short Range radio communication subsystem and a Cellular Wide Area radio communication subsystem, wherein the Short Range radio communication master subsystem includes a processing circuit configured to identify a first plurality of channels, assign a blocking priority to one or more of the first plurality of channels, identify a second plurality of channels occupied by the Cellular Wide Area radio communication subsystem, and select a third plurality of channels from the first plurality of channels based on the blocking priority of the first plurality of channels and the frequency distance between each of the first plurality of channels and each of the second plurality of channels, and a radio transceiver configured to apply the third plurality of channels to transmit or receive data on a Short Range radio communication network.

In Example 26, the subject matter of Example 25 can optionally include wherein the first plurality of channels are carrier channels available to the Short Range radio communication system for wireless data transmission.

In Example 27, the subject matter of Example 25 or 26 can optionally include wherein the applying the third plurality of channels to transmit or receive data on a Short Range radio communication network includes applying the third plurality of channels to transmit or receive data with a Short Range radio slave device.

In Example 28, the subject matter of Example 25 can optionally include wherein the selecting a third plurality of channels from the first plurality of channels includes selecting at least a predefined quantity of channels from the first plurality of channels as the third plurality of channels.

In Example 29, the subject matter of Example 28 can optionally include wherein the applying the third plurality of channels to transmit or receive data on a Short Range radio communication network includes transmitting or receiving data according to a channel hopping scheme, wherein the predefined quantity of channels is a minimum number of channels needed for the channel hopping scheme.

In Example 30, the subject matter of Example 25 or 28 can optionally include wherein the applying the third plurality of channels to transmit or receive data on a Short Range radio communication network includes transmitting or receiving data using the third plurality of channels according to channel hopping scheme.

In Example 31, the subject matter of Example 30 can optionally include wherein the channel hopping scheme is an Adaptive Frequency Hopping (AFH) scheme.

In Example 32, the subject matter of any one of Examples 25 to 31 can optionally include wherein the Short Range radio communication subsystem is a Bluetooth communication subsystem.

In Example 33, the subject matter of any one of Examples 25 to 32 can optionally include wherein the Short Range radio communication subsystem further includes a physical layer circuit configured to perform channel estimation for one or more of the first plurality of channels to obtain one or more channel metrics.

In Example 34, the subject matter of Example 33 can optionally include wherein the selecting a third plurality of channels from the first plurality of channels includes selecting the third plurality of channels from the first plurality of channels based on the blocking priorities of the first plurality of channels, the one or more channel metrics, and the frequency distance between each of the first plurality of channels and each of the second plurality of channels.

In Example 35, the subject matter of Example 25 can optionally include wherein the selecting a third plurality of channels from the first plurality of channels based on the blocking priorities of the first plurality of channels and a frequency distance between each of the first plurality of channels and each of the second plurality of channels includes comparing the first plurality of channels with the second plurality of channels to identify one or more selected channels of the first plurality of channels that are separated by a maximum frequency distance from the second plurality of channels, and including the one or more selected channels in the third plurality of channels.

In Example 36, the subject matter of Example 35 can optionally include wherein the comparing the first plurality of channels with the second plurality of channels to identify one or more selected channels of the first plurality of channels that are separated by a maximum frequency distance from the second plurality of channels includes identifying one or more of the first plurality of channels that are located furthest away in frequency from the second plurality of channels as the one or more selected channels.

In Example 37, the subject matter of Example 25 can optionally include wherein the selecting a third plurality of channels from the first plurality of channels based on the blocking priorities of the first plurality of channels and the frequency distance between each of the first plurality of channels and each of the second plurality of channels includes selecting one or more of the first plurality of channels that have low blocking priority for the third plurality of channels.

In Example 38, the subject matter of any one of Examples 25 to 37 can optionally include wherein the selecting a third plurality of channels from the first plurality of channels based on the blocking priorities of the first plurality of channels and the frequency distance between each of the first plurality of channels and each of the second plurality of channels includes identifying one or selected channels of the first plurality of channel that have low blocking priority, identifying one or more of the selected channels that are separated by a maximum frequency distance from the second plurality of channels, and including the one or more of the first plurality of channels in the third plurality of channels.

In Example 39, the subject matter of any one of Examples 25 to 38 can optionally include wherein the identifying a second plurality of channels occupied by a Cellular Wide Area radio communication subsystem includes obtaining a channel map indicating that the second plurality of channels are actively occupied by the Cellular Wide Area radio communication subsystem.

In Example 40, the subject matter of Example 39 can optionally include wherein the assigning a blocking priority to one or more of the first plurality of channels includes assigning a blocking priority to the one or more of the first plurality of channels based on the channel map.

In Example 41, the subject matter of Example 39 can optionally further include a shared memory that is accessible by the Short Range radio communication subsystem and the Cellular Wide Area radio communication subsystem, and wherein the obtaining a channel map indicating that the second plurality of channels are actively occupied by the Cellular Wide Area radio communication subsystem includes obtaining the channel map from the shared memory.

In Example 42, the subject matter of Example 39 can optionally include wherein the channel map indicates that the second plurality of channels are being utilized for wireless transmission by the Cellular Wide Area radio communication subsystem.

In Example 43, the subject matter of any one of Examples 25 to 42 can optionally include wherein the Cellular Wide Area radio communication subsystem is a Long Term Evolution (LTE) communication subsystem.

In Example 44, the subject matter of any one of Examples 25 to 43 can optionally include wherein the assigning a blocking priority to one or more of the first plurality of channels includes for each of the one or more of the first plurality of channels, selecting a selected blocking priority from a predefined plurality of blocking priorities, and assigning the selected blocking priorities to each of the one or more of the first plurality of channels.

In Example 45, the subject matter of any one of Examples 25 to 43 can optionally include wherein the assigning a blocking priority to one or more of the first plurality of channels includes for each of the one or more of the first plurality of channels, selecting a selected blocking priority from a predefined plurality of blocking priorities based on at least one of channel estimation, channel classification reports, or channel maps, and assigning the selected blocking priorities to each of the one or more of the first plurality of channels.

In Example 46, the subject matter of any one of Examples 25 to 45 can optionally include wherein the processing circuit is further configured to update the third plurality of channels based on the blocking priorities of the first plurality of channels and a frequency distance between each of the first plurality of channels and each of the second plurality of channels to obtain a fourth plurality of channels, and apply the fourth plurality of channels to transmit or receive data with the Short Range radio communication slave subsystem.

Example 47 is a multi-mode radio communication system including a Short Range radio communication master subsystem, Short Range radio communication slave subsystem, and Cellular Wide Area radio communication subsystem, the Short Range radio communication master subsystem including a processing circuit configured to identify a first plurality of channels accessible to the Short Range radio communication master subsystem, assign a blocking priority to one or more of the first plurality of channels, identify a second plurality of channels occupied by the Cellular Wide Area radio communication subsystem, and select a third plurality of channels from the first plurality of channels based on the blocking priority of the first plurality of channels and the frequency distance between each of the first plurality of channels and each of the second plurality of channels, and a radio transceiver configured to apply the third plurality of channels to transmit or receive data with the Short Range radio communication slave subsystem on a Short Range radio communication network.

In Example 48, the subject matter of Example 47 can optionally include wherein the Short Range radio communication slave subsystem is configured to transmit a channel classification report to the Short Range radio communication master subsystem.

In Example 49, the subject matter of Example 48 can optionally include wherein the Short Range radio communication slave subsystem is further configured to perform channel estimation on one or more of the first plurality of channels, and generate the channel classification report based on the channel estimation.

In Example 50, the subject matter of Example 48 can optionally include wherein the assigning a blocking priority to one or more of the first plurality of channels includes assigning a blocking priority to one or more of the first plurality of channels based on the channel classification report.

In Example 51, the subject matter of any one of Examples 47 to 50 can optionally include wherein the Short Range radio communication master subsystem and the Cellular Wide Area radio communication system are included in a common mobile device, and wherein the Short Range radio communication slave system is included in a separate mobile device.

In Example 52, the subject matter of any one of Examples 47 to 51 can optionally include wherein the selecting a third plurality of channels from the first plurality of channels includes selecting at least a predefined quantity of channels from the first plurality of channels as the third plurality of channels.

In Example 53, the subject matter of Example 52 can optionally include wherein the applying the third plurality of channels to transmit or receive data with a Short Range radio communication slave subsystem on a Short Range radio communication network includes transmitting or receiving data with the Short Range radio communication slave subsystem according to a channel hopping scheme, wherein the predefined quantity of channels is a minimum number of channels needed for the channel hopping scheme.

In Example 54, the subject matter of any one of Examples 47 to 53 can optionally include wherein the applying the third plurality of channels to transmit or receive data with a Short Range radio communication slave subsystem on a Short Range radio communication network includes transmitting or receiving data with the Short Range radio communication slave subsystem using the third plurality of channels according to channel hopping scheme.

In Example 55, the subject matter of Example 54 can optionally include wherein the channel hopping scheme is an Adaptive Frequency Hopping (AFH) scheme.

In Example 56, the subject matter of any one of Examples 47 to 55 can optionally include wherein the Short Range radio communication network is a Bluetooth communication network.

In Example 57, the subject matter of any one of Examples 47 to 56 can optionally include wherein the Short Range radio communication master subsystem further includes a physical layer circuit configured to perform channel estimation for one or more of the first plurality of channels to obtain one or more channel metrics.

In Example 58, the subject matter of Example 57 can optionally include wherein the selecting a third plurality of channels from the first plurality of channels includes selecting the third plurality of channels from the first plurality of channels based on the blocking priorities of the first plurality of channels, the one or more channel metrics, and the frequency distance between each of the first plurality of channels and each of the second plurality of channels.

In Example 59, the subject matter of Example 47 can optionally include wherein the selecting a third plurality of channels from the first plurality of channels based on the blocking priorities of the first plurality of channels and a frequency distance between each of the first plurality of channels and each of the second plurality of channels includes comparing the first plurality of channels with the second plurality of channels to identify one or more selected channels of the first plurality of channels that are separated by a maximum frequency distance from the second plurality of channels, and including the one or more selected channels in the third plurality of channels.

In Example 60, the subject matter of Example 59 can optionally include wherein the comparing the first plurality of channels with the second plurality of channels to identify one or more selected channels of the first plurality of channels that are separated by a maximum frequency distance from the second plurality of channels includes identifying one or more of the first plurality of channels that are located furthest away in frequency from the second plurality of channels as the one or more selected channels.

In Example 61, the subject matter of Example 47 can optionally include wherein the selecting a third plurality of channels from the first plurality of channels based on the blocking priorities of the first plurality of channels and the frequency distance between each of the first plurality of channels and each of the second plurality of channels includes selecting one or more of the first plurality of channels that have low blocking priority for the third plurality of channels.

In Example 62, the subject matter of Example 47 can optionally include wherein the selecting a third plurality of channels from the first plurality of channels based on the blocking priorities of the first plurality of channels and the frequency distance between each of the first plurality of channels and each of the second plurality of channels includes identifying one or selected channels of the first plurality of channel that have low blocking priority, identifying one or more of the selected channels that are separated by a maximum frequency distance from the second plurality of channels, and including the one or more of the first plurality of channels in the third plurality of channels.

In Example 63, the subject matter of any one of Examples 47 to 62 can optionally include wherein the identifying a second plurality of channels occupied by a Cellular Wide Area radio communication subsystem includes obtaining a channel map indicating that the second plurality of channels are actively occupied by the Cellular Wide Area radio communication subsystem.

In Example 64, the subject matter of Example 63 can optionally include wherein the assigning a blocking priority to one or more of the first plurality of channels includes assigning a blocking priority to the one or more of the first plurality of channels based on the channel map.

In Example 65, the subject matter of Example 63 can optionally include wherein the Short Range radio communication master subsystem and the Cellular Wide Area radio communication subsystem are included in a common mobile device that further includes a shared memory accessible by the Short Range radio communication master subsystem and the Cellular Wide Area radio communication subsystem, and wherein the obtaining a channel map indicating that the second plurality of channels are actively occupied by the Cellular Wide Area radio communication subsystem includes obtaining the channel map from the shared memory.

In Example 66, the subject matter of Example 65 can optionally include wherein the Cellular Wide Area radio communication subsystem is configured to provide the channel map to the shared memory.

In Example 67, the subject matter of Example 63 can optionally include wherein the channel map indicates that the second plurality of channels are being utilized for wireless transmission by the Cellular Wide Area radio communication subsystem.

In Example 68, the subject matter of any one of Examples 47 to 67 can optionally include wherein the Cellular Wide Area radio communication subsystem is a Long Term Evolution (LTE) communication subsystem.

In Example 69, the subject matter of any one of Examples 47 to 68 can optionally include wherein the assigning a blocking priority to one or more of the first plurality of channels includes for each of the one or more of the first plurality of channels, selecting a selected blocking priority from a predefined plurality of blocking priorities, and assigning the selected blocking priorities to each of the one or more of the first plurality of channels.

In Example 70, the subject matter of any one of Examples 47 to 68 can optionally include wherein the assigning a blocking priority to one or more of the first plurality of channels includes for each of the one or more of the first plurality of channels, selecting a selected blocking priority from a predefined plurality of blocking priorities based on at least one of channel estimation, channel classification reports, or channel maps, and assigning the selected blocking priorities to each of the one or more of the first plurality of channels.

In Example 71, the subject matter of any one of Examples 47 to 70 can optionally include wherein the processing circuit is further configured to update the third plurality of channels based on the blocking priorities of the first plurality of channels and a frequency distance between each of the first plurality of channels and each of the second plurality of channels to obtain a fourth plurality of channels, and apply the fourth plurality of channels to transmit or receive data with the Short Range radio communication slave subsystem.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A mobile device comprising a Short Range radio communication subsystem and a Cellular Wide Area radio communication subsystem, wherein the Short Range radio communication master subsystem comprises:
   a processing circuit configured to:
   identify a first plurality of channels available for the Short Range radio communication system,
   assign a blocking priority to one or more of the first plurality of channels, wherein at least two of the first plurality of channels are assigned different blocking priorities,
   identify a second plurality of channels occupied by the Cellular Wide Area radio communication subsystem, and
   select a third plurality of channels from the first plurality of channels based on differences in blocking priority of the first plurality of channels and the frequency distance between the first plurality of channels and the second plurality of channels; and
   a radio transceiver configured to apply the third plurality of channels to transmit or receive data on a Short Range radio communication network.

2. The mobile device of claim 1, wherein the applying the third plurality of channels to transmit or receive data on a Short Range radio communication network comprises:
   applying the third plurality of channels to transmit or receive data with a Short Range radio slave device.

3. The mobile device of claim 1, wherein the selecting a third plurality of channels from the first plurality of channels comprises:
   selecting at least a predefined quantity of channels from the first plurality of channels as the third plurality of channels.

4. The mobile device of claim 3, wherein the applying the third plurality of channels to transmit or receive data on a Short Range radio communication network comprises:
   transmitting or receiving data according to a channel hopping scheme, wherein the predefined quantity of channels is a minimum number of channels needed for the channel hopping scheme.

5. The mobile device of claim 1, wherein the applying the third plurality of channels to transmit or receive data on a Short Range radio communication network comprises:
   transmitting or receiving data using the third plurality of channels according to channel hopping scheme.

6. The mobile device of claim 1, wherein the Short Range radio communication subsystem is a Bluetooth communication subsystem.

7. The mobile device of claim 1, wherein the Short Range radio communication subsystem further comprises a physical layer circuit configured to perform channel estimation for one or more of the first plurality of channels to obtain one or more channel metrics.

8. The mobile device of claim 7, wherein the selecting a third plurality of channels from the first plurality of channels comprises:
   selecting the third plurality of channels from the first plurality of channels based on the blocking priorities of the first plurality of channels, the one or more channel metrics, and the frequency distance between each of the first plurality of channels and each of the second plurality of channels.

9. The mobile device of claim 1, wherein the selecting a third plurality of channels from the first plurality of channels based on the blocking priorities of the first plurality of channels and a frequency distance between each of the first plurality of channels and each of the second plurality of channels comprises:
   comparing the first plurality of channels with the second plurality of channels to identify one or more selected channels of the first plurality of channels that are separated by a maximum frequency distance from the second plurality of channels; and
   including the one or more selected channels in the third plurality of channels.

10. The mobile device of claim 9, wherein the comparing the first plurality of channels with the second plurality of channels to identify one or more selected channels of the first plurality of channels that are separated by a maximum frequency distance from the second plurality of channels comprises:
    identifying one or more of the first plurality of channels that are located furthest away in frequency from the second plurality of channels as the one or more selected channels.

11. The mobile device of claim 1, wherein the selecting a third plurality of channels from the first plurality of channels based on the blocking priorities of the first plurality of channels and the frequency distance between each of the first plurality of channels and each of the second plurality of channels comprises:
    identifying one or selected channels of the first plurality of channel that have low blocking priority;
    identifying one or more of the selected channels that are separated by a maximum frequency distance from the second plurality of channels; and
    including the one or more of the first plurality of channels in the third plurality of channels.

12. The mobile device of claim 1, wherein the identifying a second plurality of channels occupied by a Cellular Wide Area radio communication subsystem comprises:
    obtaining a channel map indicating that the second plurality of channels are actively occupied by the Cellular Wide Area radio communication subsystem.

13. The mobile device of claim 1, wherein the Cellular Wide Area radio communication subsystem is a Long Term Evolution (LTE) communication subsystem.

14. The mobile terminal device of claim 1, wherein the assigning a blocking priority to one or more of the first plurality of channels comprises:
    for each of the one or more of the first plurality of channels, selecting a selected blocking priority from a predefined plurality of blocking priorities based on at least one of channel estimation, channel classification reports, or channel maps; and
    assigning the selected blocking priorities to each of the one or more of the first plurality of channels.

15. A multi-mode radio communication system comprising a Short Range radio communication master subsystem, Short Range radio communication slave subsystem, and Cellular Wide Area radio communication subsystem, the Short Range radio communication master subsystem comprising:
    a processing circuit configured to:
    identify a first plurality of channels accessible to the Short Range radio communication master subsystem,
    assign a blocking priority to one or more of the first plurality of channels, wherein at least two of the first plurality of channels are assigned different blocking priorities, identify a second plurality of channels occupied by the Cellular Wide Area radio communication subsystem, and select a third plurality of channels from the first plurality of channels based on differences in blocking priority of the first plurality of channels and the frequency distance between the first plurality of channels and the second plurality of channels; and a radio transceiver configured to apply the third plurality of channels to transmit or receive data with the Short Range radio communication slave subsystem on a Short Range radio communication network.

16. The multi-mode radio communication system of claim 15, wherein the Short Range radio communication slave subsystem is configured to transmit a channel classification report to the Short Range radio communication master subsystem.

17. The multi-mode radio communication system of claim 16, wherein the assigning a blocking priority to one or more of the first plurality of channels comprises:

assigning a blocking priority to one or more of the first plurality of channels based on the channel classification report.

18. The multi-mode radio communication system of claim 15, wherein the Short Range radio communication master subsystem and the Cellular Wide Area radio communication system are included in a common mobile device, and wherein the Short Range radio communication slave system is included in a separate mobile device.

19. A method for Short Range radio communication in a mobile device, the method comprising:

identifying a first plurality of channels available for a Short Range radio access technology;

assigning a blocking priority to one or more of the first plurality of channels, wherein at least two of the first plurality of channels are assigned different blocking priorities;

identifying a second plurality of channels occupied by a Cellular Wide Area radio communication subsystem of the mobile device;

selecting a third plurality of channels from the first plurality of channels based on differences in blocking priorities of the first plurality of channels and a frequency distance between the first plurality of channels and the second plurality of channels; and applying the third plurality of channels to transmit or receive data on a Short Range radio communication network.

20. The method of claim 19, wherein the applying the third plurality of channels to transmit or receive data on a Short Range radio communication network comprises:

applying the third plurality of channels to transmit or receive data with a Short Range radio slave device.

21. The method of claim 19, wherein the selecting a third plurality of channels from the first plurality of channels comprises:

selecting at least a predefined quantity of channels from the first plurality of channels as the third plurality of channels.

22. The method of claim 19, wherein the applying the third plurality of channels to transmit or receive data on a Short Range radio communication network comprises:

transmitting or receiving data using the third plurality of channels according to channel hopping scheme.

23. The method of claim 19, wherein the Short Range radio communication network is a Bluetooth communication network.

24. The method of claim 19, wherein the comparing the first plurality of channels with the second plurality of channels to identify one or more selected channels of the first plurality of channels that are separated by a maximum frequency distance from the second plurality of channels comprises:

identifying one or more of the first plurality of channels that are located furthest away in frequency from the second plurality of channels as the one or more selected channels.

* * * * *